US009381715B2

(12) United States Patent
Birkle et al.

(10) Patent No.: US 9,381,715 B2
(45) Date of Patent: *Jul. 5, 2016

(54) METHOD AND APPARATUS FOR INFLATING AND SEALING PACKING CUSHIONS WITH ROTARY SEALING MECHANISM

(71) Applicant: Free-Flow Packaging International, Inc., Fremont, CA (US)

(72) Inventors: James Birkle, Redwood City, CA (US); Rob Van Uijen, Kapelaan (NL); William 'Rob' Robinson, Redwood City, CA (US); Vivek Krishnan, Redwood City, CA (US); Charles Daigle, San Jose, CA (US); Michael Lee, Hoensbroek (NL); Sander Roelofs, Heerlen (NL)

(73) Assignee: Free-Flow Packaging International, Inc., Fremont, CA (US)

( * ) Notice: Subject to any disclaimer, the term of this patent is extended or adjusted under 35 U.S.C. 154(b) by 820 days.

This patent is subject to a terminal disclaimer.

(21) Appl. No.: 13/645,573

(22) Filed: Oct. 5, 2012

(65) Prior Publication Data

US 2013/0032293 A1     Feb. 7, 2013

Related U.S. Application Data

(63) Continuation-in-part of application No. 12/553,150, filed on Sep. 3, 2009, now Pat. No. 8,402,719.

(60) Provisional application No. 61/093,858, filed on Sep. 3, 2008.

(51) Int. Cl.
| | |
|---|---|
| *B65B 31/04* | (2006.01) |
| *B31D 5/00* | (2006.01) |
| *B29C 65/18* | (2006.01) |
| *B29C 65/30* | (2006.01) |
| *B29C 65/78* | (2006.01) |
| *B29C 65/00* | (2006.01) |

(Continued)

(52) U.S. Cl.
CPC .............. *B31D 5/0073* (2013.01); *B29C 65/18* (2013.01); *B29C 65/305* (2013.01);
(Continued)

(58) Field of Classification Search
CPC ...... B32B 38/00; B32B 38/004; B65B 31/04; B29C 66/439; B29C 65/7873; B31D 5/0073
USPC ............................................... 53/79; 156/538
See application file for complete search history.

(56) References Cited

U.S. PATENT DOCUMENTS

| 2,987,106 A | * | 6/1961 | Messmer | ................ B29C 65/18 |
| | | | | 156/510 |
| 2,993,523 A | | 7/1961 | Monaco et al. | |

(Continued)

FOREIGN PATENT DOCUMENTS

| GB | 2384459 A | 7/2003 |
| JP | 8216258 | 8/1996 |

OTHER PUBLICATIONS

International Search Report mailed Oct. 22, 2009 for PCT/US2009/055840.

*Primary Examiner* — Gloria R Weeks
(74) *Attorney, Agent, or Firm* — Banner & Witcoff, Ltd.

(57) ABSTRACT

An apparatus for inflating and sealing packing cushions has a drive mechanism for feeding a preconfigured film material to a sealing mechanism in a flattened state without wrinkles in the sealing region in which a longitudinal seal is formed. A feed mechanism includes a drive mechanism for advancing the film along a path, a first guide member which contacts a first surface of the film material in a first longitudinal region, and a second guide member which contacts the first surface of the film material in a second longitudinal region laterally offset from and parallel to the first longitudinal region. In some embodiments, the first and second guide members are adjacent belts. In other embodiments, the first and second guide members are stationary guide members or "skis." The sealing mechanism may include a rotary sealing element and opposed backing element, such as a belt or a wheel.

11 Claims, 23 Drawing Sheets

(51) Int. Cl.
*B29L 22/02* (2006.01)
*B29C 65/22* (2006.01)

(52) U.S. Cl.
CPC ........ *B29C 65/7873* (2013.01); *B29C 65/7894* (2013.01); *B29C 66/1122* (2013.01); *B29C 66/439* (2013.01); *B29C 66/81422* (2013.01); *B29C 66/81427* (2013.01); *B29C 66/83413* (2013.01); *B29C 66/83431* (2013.01); *B29C 66/91212* (2013.01); *B29C 66/91231* (2013.01); *B29C 65/222* (2013.01); *B29C 66/71* (2013.01); *B29C 66/7352* (2013.01); *B29C 66/8167* (2013.01); *B29C 66/81264* (2013.01); *B29C 66/81457* (2013.01); *B29K 2995/007* (2013.01); *B29L 2022/02* (2013.01); *B31D 2205/0005* (2013.01); *B31D 2205/0052* (2013.01); *Y10T 156/17* (2015.01)

(56) References Cited

U.S. PATENT DOCUMENTS

| | | |
|---|---|---|
| 3,660,189 A | 5/1972 | Troy |
| 3,710,533 A * | 1/1973 | Burns ........................... 53/157 |
| 4,017,351 A | 4/1977 | Larson et al. |
| 5,942,076 A | 8/1999 | Salerno et al. |
| 6,170,227 B1 | 1/2001 | Kovacs et al. |
| 6,341,473 B1 | 1/2002 | Kovacs et al. |
| 6,460,313 B1 | 10/2002 | Cooper |
| 6,605,169 B2 * | 8/2003 | Perkins et al. ................ 156/147 |
| 6,635,145 B2 | 10/2003 | Cooper |
| 7,165,375 B2 | 1/2007 | O'Dowd |
| 7,225,599 B2 | 6/2007 | Sperry et al. |
| 7,231,749 B2 | 6/2007 | Garceau et al. |
| 7,343,723 B2 | 3/2008 | Perkins |
| 7,490,449 B1 * | 2/2009 | Eibert ............................. 53/79 |
| 7,913,474 B2 * | 3/2011 | Aquarius ........................ 53/403 |
| 8,402,719 B2 * | 3/2013 | Birkle et al. ..................... 53/79 |
| 2002/0108697 A1 | 8/2002 | Perkins et al. |
| 2005/0160699 A1 * | 7/2005 | Perkins ........................... 53/403 |
| 2006/0090421 A1 | 5/2006 | Sperry et al. |
| 2006/0210738 A1 * | 9/2006 | Slovencik et al. ............ 428/35.2 |
| 2006/0292320 A1 | 12/2006 | Greenwood et al. |
| 2007/0251190 A1 | 11/2007 | Daigle et al. |
| 2008/0066852 A1 | 3/2008 | Wetsch et al. |
| 2008/0141620 A1 | 6/2008 | Szabo |
| 2013/0232913 A1 * | 9/2013 | Greenwood et al. ............. 53/79 |
| 2014/0130461 A1 * | 5/2014 | Johan ............................. 53/468 |

* cited by examiner

METHOD AND APPARATUS FOR INFLATING AND SEALING PACKING CUSHIONS WITH ROTARY SEALING MECHANISM

CROSS REFERENCE TO RELATED APPLICATIONS

This is a continuation-in-part of application Ser. No. 12/553,150, filed Sep. 3, 2009, which claims priority under 35 U.S.C. §119(e) to Provisional Application No. 61/093,858, filed Sep. 3, 2008, the disclosures of which are hereby incorporated by reference in their entireties.

DESCRIPTION OF RELATED ART

Air-filled pillows or cushions may be used as a packing material and void filler in shipping cartons and the like. Such cushions typically have two layers of plastic film material which may be sealed together to form chambers that are filled with air or other suitable gas. The cushions are usually made from a long roll of material which typically has a longitudinal direction along the film and a traverse direction across the film. The film may be made of plastic or other suitable material known in the art. The film may be supplied and stored in rolls or in boxes. Typically, the film includes perforations which may be disposed generally in the transverse direction across the film, but may also be located in other orientations such as diagonally. The perforations may be variously configured such as between one or more successive ones of the cushions so they can be torn apart or otherwise separated.

Although very light in weight, air-filled cushions take up a substantial amount of space. To reduce the volume of material which must be shipped and stored, such cushions are commonly made at or near the point of use. To avoid the need for packers and shippers to have large, complex cushion making machines in their facilities, suppliers of air-filled packing cushions often provide their customers with film materials in which the major seals and perforations have already been formed (hereinafter referred to as "preconfigured film material").

Packers and shippers who use preconfigured film materials are provided with relatively inexpensive and easy-to-use machines for inflating and sealing the materials to complete the cushions at or near the point of use. Many machines are equipped with an elongate guide member which is inserted into a longitudinally extending channel in the film for guiding the film through the machine. In some machines, the guide includes a nozzle for injecting air into the cushion chambers. In other machines, air is injected from an injector separate from the guide. Examples of machines in which air is injected into cushion chambers through an elongate guide member include U.S. Pat. Nos. 6,209,286, 6,659,150, 6,410,119, 7,174,696, and 7,325,377, all to the present assignee, the disclosures of which are incorporated herein by reference. Examples of machines in which inflation gas is injected into an open edge of a film or through perforations are shown in WO 00/43198, WO 00/43270, and U.S. Pat. Nos. 5,873,215 and 6,375,785, each owned by the present assignee, the disclosures of which are incorporated herein by reference.

SUMMARY OF THE INVENTION

The present invention is directed to a method and apparatus for making air-filled packing cushions from a preconfigured film material. In one aspect, a feed mechanism is configured to present a preconfigured film material to a sealing mechanism in a flatten state without wrinkles in the sealing region of the film material in which a longitudinal seal is formed. The feed mechanism includes a drive mechanism for advancing the film along a path, a first guide member which contacts a first surface of the film material in a first longitudinal region, and a second guide member which contacts the first surface of the film material in a second longitudinal region laterally offset from and parallel to the first longitudinal region. In some examples, the first guide member and the second guide member comprise a pair of upper adjacent belts and a backing element. In other examples, the first guide member and the second guide member comprise first and second stationary members, such as "skis," and a backing element. The backing element may be, for example, a lower belt or a wheel. The sealing mechanism may contact the film material in a sealing region (e.g., located between the laterally-spaced first and second longitudinal regions) to produce a high quality longitudinal seal with significantly reduced instances of burning, pinhole leaks, and weakly bonded seals that typically result from film wrinkles.

In one aspect, the sealing mechanism may be a rotary sealing mechanism comprising a source of heat and a rotary sealing element. The rotary sealing mechanism may include a wheel made from a thermally conductive material, such as aluminum. The rotary sealing mechanism, together with the drive mechanism, may facilitate significantly higher production speeds than are possible with conventional air cushion machines.

One or more of the mechanisms for feeding, driving, inflating, and sealing the film may be made adjustable such that the device is capable of processing a wide (and potentially unlimited) variety of preconfigured film materials, e.g., film materials having differently sized and/or differently configured chambers. Operation of these various mechanisms may be coordinated with a controller. In some aspects, the controller may identify the type of film without the need for operator input (e.g., using RFID technology or the like), and automatically affect any needed adjustment of operation parameter(s) appropriate for the type of film used.

In some embodiments, the preconfigured film material may include a longitudinally extending channel and inflatable chambers which communicate with the channel. In these embodiments, the film material may be fed onto an elongate member which may be positionable in the longitudinally extending channel and configured to have inflation gas introduced into the chambers using a separate or integral injector to inflate the cushions. In alternative embodiments, a film material may have an open edge into which an inflation gas is injected from an injector.

While certain aspects of the invention have been called out specifically in the Summary of the Invention for illustrative purposes, additional aspects of the invention are defined below in the remaining portions of the specification. The aforementioned aspects of the invention and the additional aspects of the invention detailed below may be utilized in any suitable combination and subcombination.

BRIEF DESCRIPTION OF THE DRAWINGS

The present invention will now be described in more detail with reference to preferred embodiments of the invention, given only by way of example, and illustrated in the accompanying drawings in which:

FIG. 15b is an exploded view thereof; and FIG. 15c is a cross-sectional view thereof.

DETAILED DESCRIPTION OF THE INVENTION

According to one aspect of the invention, an apparatus for inflating and sealing packing cushions has a feed mechanism capable of presenting a preconfigured film material to a sealing mechanism such that the film material is in a flatten state and free or substantially free of wrinkles in the sealing region, e.g., the area of the film in which a longitudinal seal is formed to trap inflation gas in the chambers. The feed mechanism includes a drive mechanism for advancing the film along a path, a first guide member which contacts a first surface of the film material in a first longitudinal region, and a second guide member which contacts the first surface of the film material in a second longitudinal region laterally offset from and parallel to the first longitudinal region. In some examples, the feed mechanism comprises a pair of upper adjacent belts and a backing element. In other examples, the first guide member and the second guide member comprise first and second stationary members, such as "skis," and a backing element. The backing element may be, for example, a lower belt or a backing wheel. The sealing mechanism may contact the film material in an area of the film positioned between the upper adjacent belts.

Terms such as "upper" and "lower" are used herein for illustrative purposes and ease of reference. It should be recognized that such terms are not limiting, as the orientation of the various elements as well as that of the overall apparatus may vary from that described herein without departing from the scope of the invention.

Figure 8:
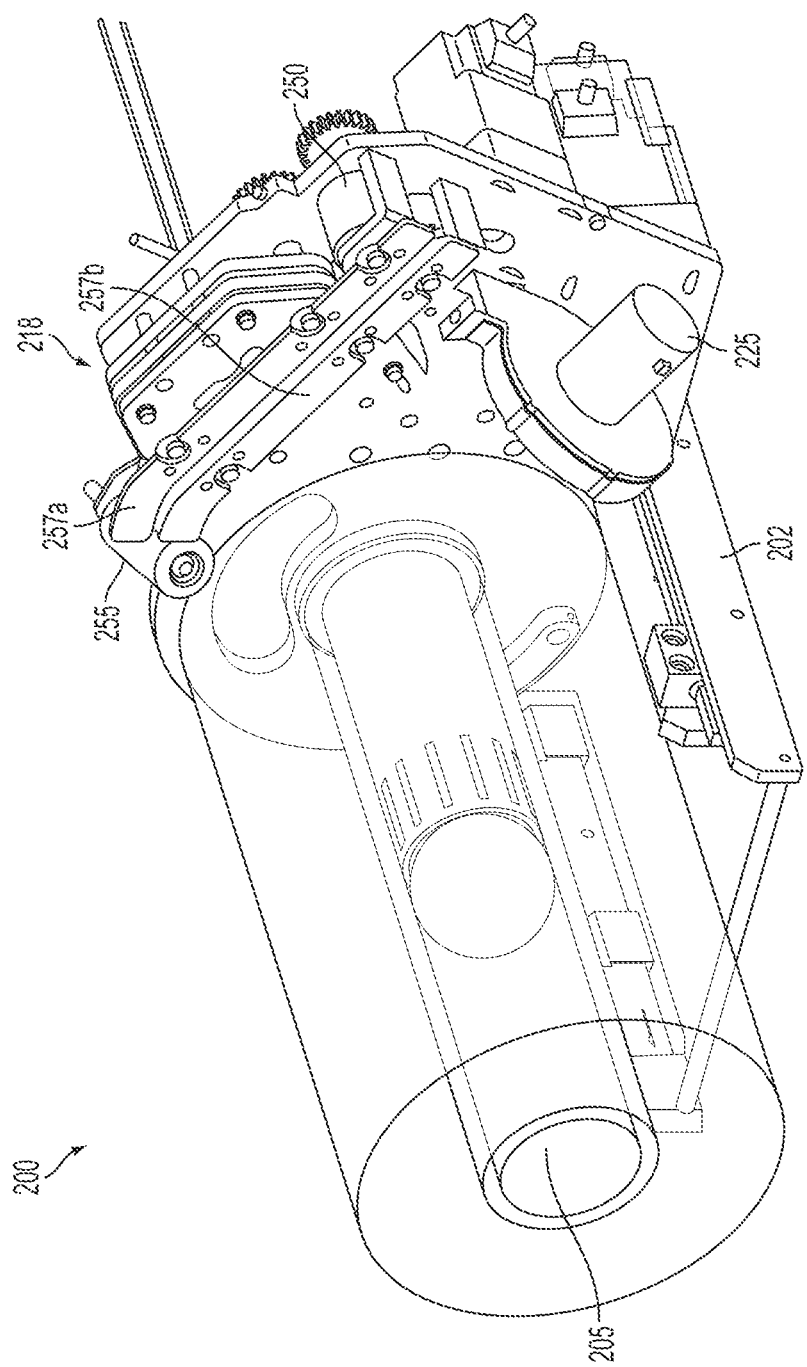
FIG. 8 is a front perspective view of an apparatus for inflating and sealing air-filled packing cushions.

FIGS. 8-12 illustrate an example of an apparatus 200 for inflating and sealing packing cushions in accordance with the present invention. The apparatus 200 is relatively compact and is adapted to be conveniently placed on a table top or other surface, such as a custom stand (not illustrated). The apparatus 200 can be constructed of a lightweight material such as a durable plastic or light metal. With reference to FIG. 8, the apparatus 200 includes a frame having a base 202 and a vertical wall supporting a mandrel 205, a sealing mechanism having a belt drive assembly 218, and an adjustable speed blower 225 for supplying air to an air injector 210. The mandrel may contain a roll of preconfigured film material (shown in shadowed area).

Figure 10:
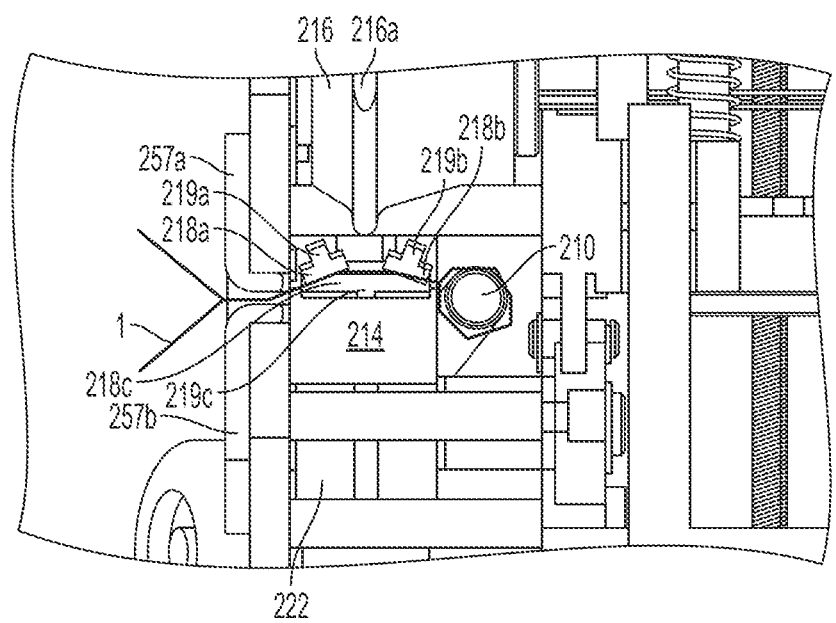
FIG. 10 is a cross-sectional view of the sealing mechanism and inflation mechanism of the apparatus shown in FIG. 8.
Figure 16:
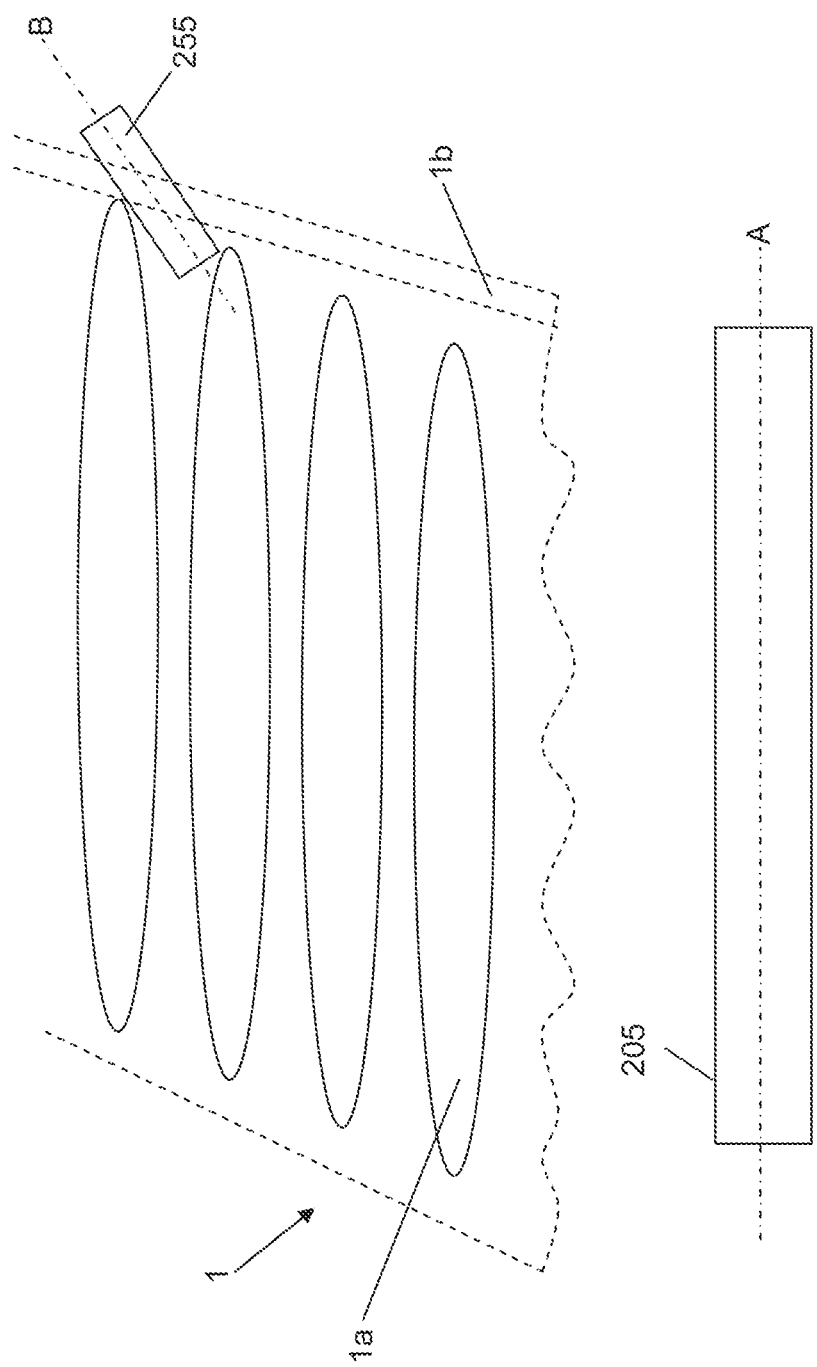
FIG. 16 is a schematic illustration of a film edge guide.

In one aspect, upper and lower film edge guides 257a and 257b, respectively, may be provided for aligning the film with the inflation and sealing mechanisms. As shown in FIGS. 8 and 10, the upper and lower film edge guides 257a and 257b are separated by a relatively narrow gap through which the edge portion of the film material is fed to the inflation and sealing mechanisms. As inflation gas is injected into the film material, the chambers are inflated such that the height of the chambers becomes greater than the gap between the upper and lower film edge guides 257a and 257b. This is illustrated in FIG. 10, where the "V" shape in the left-hand portion of the film 1 represents the inflated chambers. The inflated chambers assist in keeping the film material in a flatten state as it is fed through the inflation and sealing mechanisms by resisting lateral movement of the film material through the gap between the film edge guides 257a and 257b. An optional guide roller 255 also may be provided. As shown in FIG. 8, the guide roller 255 may be positioned in approximately the same vertical plane as the mandrel 205. As the film is unwound from the mandrel, an edge portion of the film passes over the guide roller 255 toward the belt drive assembly 218. The guide roller 255 thereby provides a constant film path to the inflation and sealing mechanisms as the roll of material depletes. As shown in FIG. 16, the axis B of the guide roller 255 may be offset with respect to the axis A of the mandrel 205, e.g., at an angle of approximately 30-45 degrees. As the film 1 passes over the guide roller 255, the offset axis B causes the edge of the film 1 to be raised somewhat, which tensions the film as it is guided toward the inflation and sealing mechanisms.

The mandrel 205 may be equipped with a clamping mechanism (not shown) for securing a roll of film. The clamping mechanism may include a handle that is movable between a disengaged position, e.g., where the longitudinal axis of the handle is generally parallel to the axis of the mandrel 205, to an engaged position, e.g., where the axis of the handle is generally perpendicular to the axis of the mandrel 205.

The apparatus 200 also may have a perforation tear unit 250. An example of a perforation tear unit is described in commonly owned U.S. Pat. No. 7,343,723 B2, the disclosure of which is hereby incorporated by reference. The perforation tear unit 250 includes a pair of nip rollers that can be actuated to partially tear the film along the laterally extending perforations to assist an operator in separating inflated cushions or groups of inflated cushions from each other. Alternatively, a sheeting unit may be provided which completely tears the film along the lateral perforations to separate inflated cushions or groups of inflated cushions from each other. As discussed more fully below, perforation tear unit 250 or sheeting unit may be associated with a controller for automatically tearing the film along the perforations after inflating a predetermined number of cushions. This way, the apparatus 200 can be programmed to produce inflated film segments of a desired length (e.g., having one, two, three, four, five, six, or more inflated cushions).

Figure 9:
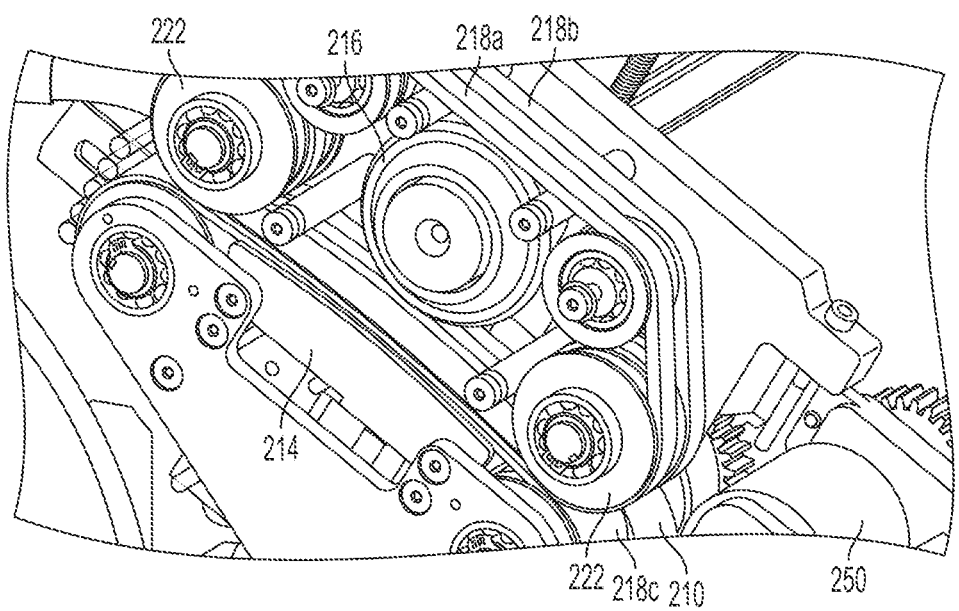
FIG. 9 is an exploded view of the sealing mechanism of the apparatus shown in FIG. 8.

FIG. 9 is an exploded view of the belt drive assembly 218 and sealing mechanism 216 of the apparatus shown in FIG. 8. The belt drive assembly comprises a pair of adjacent upper belts 218a and 218b and a lower belt 218c. Upper and lower drive rollers 222 are driven by a motor for rotating the upper belts 218a and 218b and the lower belt 218c. A rotary sealing mechanism 216 is positioned such that a sealing element 216a contacts the film in a sealing region located between the two upper belts 218a and 218b to form a longitudinal seal to trap inflation gas in the chambers. A support surface 214, which may be a block constructed from aluminum or other metal, is positioned underneath the lower belt 218c to provide an anvil surface against which the lower belt 218c is deflected by pressure from the sealing mechanism 216.

FIG. 10 is a cross-sectional view showing the rotary sealing mechanism 216 which has a relatively narrow convex portion forming a sealing element 216a around its circumference; the guide/air injector 210; the support surface 214; and the upper 218a, 218b and the lower 218c drive belts. The open "V" shape in left-hand portion of the film 1 as shown in FIG. 10 represents the chamber into which the inflation gas is injected. The right-hand portion of the film 1 as shown in FIG. 10 is the longitudinal channel into which the guide 210 is inserted. In this embodiment, the guide 210 also functions as an air injector by discharging air (or other inflation gas) through one or more openings located at or near the distal end of the guide 210. In other embodiments, an injector separate from the guide may be used to inject inflation gas into the chambers. A knife blade may be located along the guide 210 for slitting the film to permit continued movement of the film past the sealing area. The inflated cushions are heat-sealed as the film 1 passes between the sealing mechanism 216 and the lower drive belt 218c.

In another aspect, one or more of the drive belts may be crowned to assist in maintaining the film material in a flattened state in the sealing region as it is fed through the sealing mechanism. For example, as illustrated in FIG. 10, the drive belts 218a, 218b, and 218c may be crowned such that the sealing region of the film 1 (e.g., the portion of the film 1 positioned directly below the sealing element 216a) is raised relative to the adjacent portions of the film 1. Alternatively, the belts 218a, 218b, and 218c may be crowned in a different (e.g., opposite) configuration that functions to flatten the film 1 in the sealing region by pulling the film 1 outwardly relative to the sealing region. The crowned drive belts 218a, 218b, and 218c present the film to the sealing mechanism 216 in a smooth, flattened state without wrinkling of the film material. This enables the sealing element 216a to produce a longitudinal seal with significantly greater quality and precision, and with significantly lower instances of burning compared to seals formed using conventional air cushion machines. The combination of the rotary sealing mechanism 216 and the drive belt assembly 218 also enables the device to operate at significantly higher production speeds, e.g., as high as 120 feet/minute or more. Conventional air cushion machines employing a sealing rod, for example, typically are limited to production speeds of no more than about 70 feet/minute due to the slow heat transfer rate through the sealing belt and the high friction created between the rod and the belt.

Figure 17:
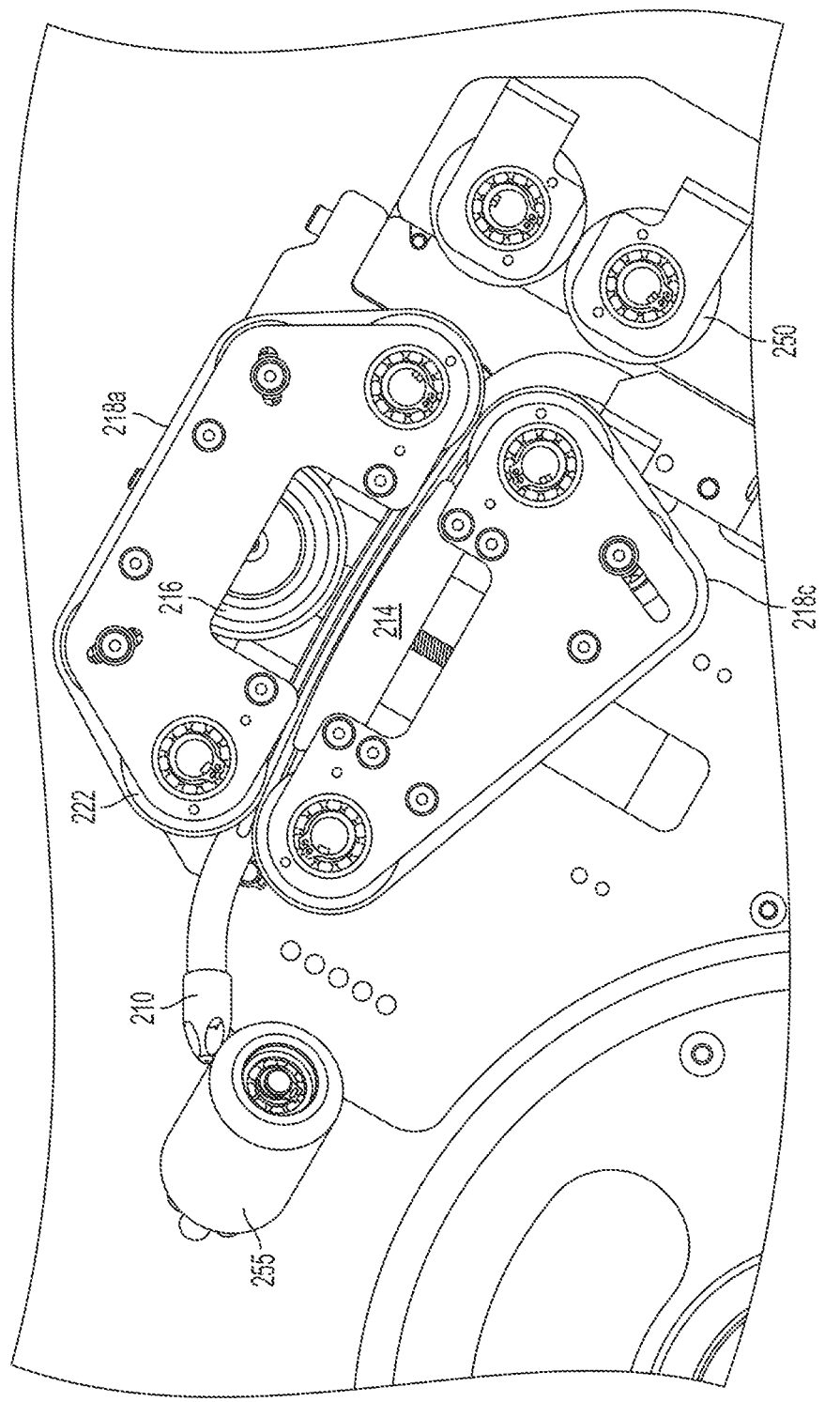
FIG. 17 is a side elevation view of the apparatus shown in FIG. 8, illustrating the curved surface of the support element 214 in accordance with one aspect of the invention.

In another aspect, as illustrated in FIG. 17, the surface of the support element 214 may be curved in the direction of the film path. The apex of the curve may be located at approximately the center of the support element 214, e.g., where the sealing mechanism 216 contacts the film material. The curved surface of the support element 214 effectively lengthens the path of the film material, which helps to compensate for dimensional changes in the film material as it is processed. In particular, the length of the film material is decreased somewhat as the chambers are inflated (due to expansion of the film material in the thickness direction). However, the edge portion of the film material that is sealed by the sealing mechanism 216 is not inflated, and thus the length of the edge portion is not decreased as the chambers are inflated. As a result, the edge portion of the film material is prone to gathering as the chambers are inflated, e.g., in an "accordion" fashion. The curved surface of the support element 214 increases the length of the film path, which assists in maintaining the film material in a flattened state as it is fed through the sealing mechanism 216.

As illustrated in FIG. 10, each of the drive belts 218a, 218b, and 218c may have a rib 219a, 219b, and 219c, respectively, (e.g., of rectangular cross-section) running along its length on the surface opposite the film-contacting surface. The ribs 219a, 219b, and 219c may engage corresponding grooves in the drive rollers 222 to guide and prevent slipping of the drive belts 218a, 218b, and 218c along the drive rollers 222. In the case of the lower drive belt 218c, the rib 219c also further assists in straightening the film in the sealing region. In particular, the rib 219c on the lower drive belt 218c may be aligned with the sealing element 216a such that when the sealing element 216a presses the lower belt 218c against the support surface 214, the rib 219c creates a reactive force which deflects the lower belt 218c to straighten the film in the sealing region.

In the embodiment shown in FIGS. 8-12, the lower belt 218c is used as a backing element for the sealing mechanism 216. As used herein, the term "backing element" refers to the structure that contacts the film material opposite the sealing mechanism. The backing element typically is constructed of a resilient material, e.g., natural rubber or a synthetic rubber such as silicone rubber. The resilient surface conforms in part to the sealing element 216a, which improves seal quality and increases seal dwell time. When a resilient backing element is used, a support element such as block 214 usually is used as an anvil surface, as previously described. Non-limiting examples of support elements include drums, plates, wheels, boxes, and other surfaces constructed from metal or other rigid material. The support element may have a resilient material applied to one or more of its surfaces to function as a backing element. For example, a backing element can be formed by vulcanizing a ¼ inch layer of rubber onto an aluminum or steel wheel or other support element. Alternatively, a backing element can be preconfigured as a resilient band and stretched over a backing element. The thickness of the backing element usually ranges from about 1/8 to about 1/4 inch. The resilient material should be selected such that the film material does not unduly stick to the backing element. Also, the resilient material should be selected such that it does not degrade under heat. Suitable resilient materials often have a Shore A hardness of from about 20 to about 95 durometer, usually from about 45 to about 75, and more usually from about 50 to about 70. For example, a silicone rubber of 60 durometer may be used.

Figure 11A:
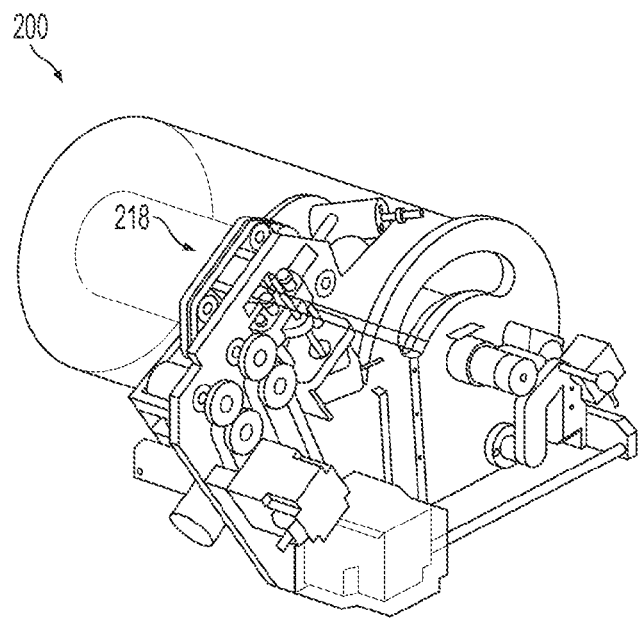
FIG. 11a is a rear perspective view of the apparatus shown in FIG. 8.
Figure 11B:
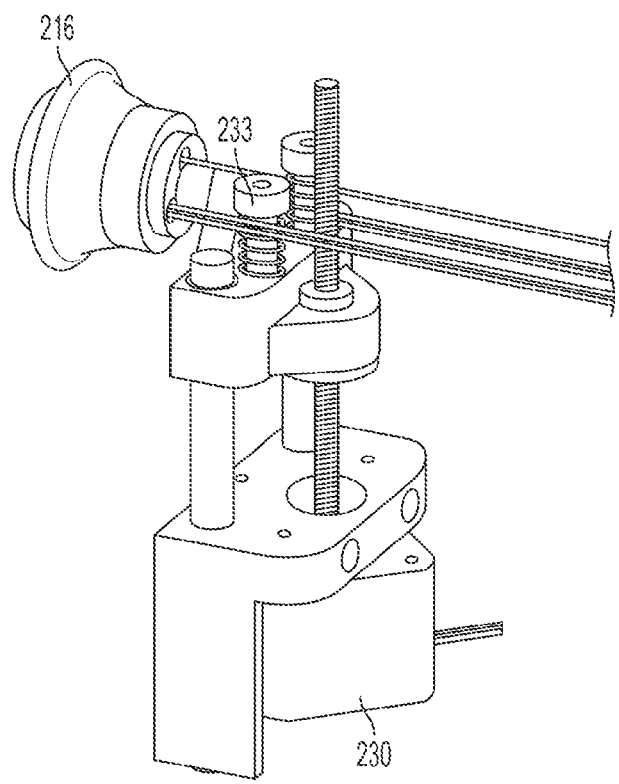
FIG. 11b is an exploded view of a sealing mechanism actuator.

The sealing mechanism 216 may be mounted such that its axis is fixed relative to the sidewall of the frame 202, or such that it is displaceable toward and away from the support surface 214, either manually or by mechanical assistance. It may be desirable to retract the sealing mechanism 216 away from the film 1, e.g., when operation of the apparatus is interrupted so as to prevent burning of the film 1. As shown in FIGS. 11a and 11b, a linear stepper actuator 230 may be used for adjusting the position of the sealing mechanism 216. The position of the sealing mechanism 216 also may be adjusted for increasing or decreasing the pressure between the sealing element 216a and the lower drive belt 218c. For example, the actuator 230 may cause the sealing mechanism 216 to be displaced such that springs 233 are compressed or decompressed to create more or less seal force, respectively. Sealing pressure can be adjusted, for example, to accommodate films of different thickness. As an alternative to a linear actuator, sealing pressure can be made adjustable by providing a thumb screw or the like for adjusting the position of the sealing mechanism 216 and/or backing element and without requiring significant disassembly of the machine or replacement of parts.

In the embodiment illustrated in FIGS. 8-12, the sealing mechanism 216 is freewheeling, e.g., is caused to rotate by the movement of the film 1 against which the sealing element 216a is pressed. As previously discussed, the upper belts 218a and 218b and the lower belt 218c, all of which are driven by feed rollers 222, cause the film 1 to be advanced. As an alternative to a freewheeling sealing mechanism 216, a motor may be provided for rotating the sealing mechanism in coordination with the other driving mechanisms.

Figure 12A:
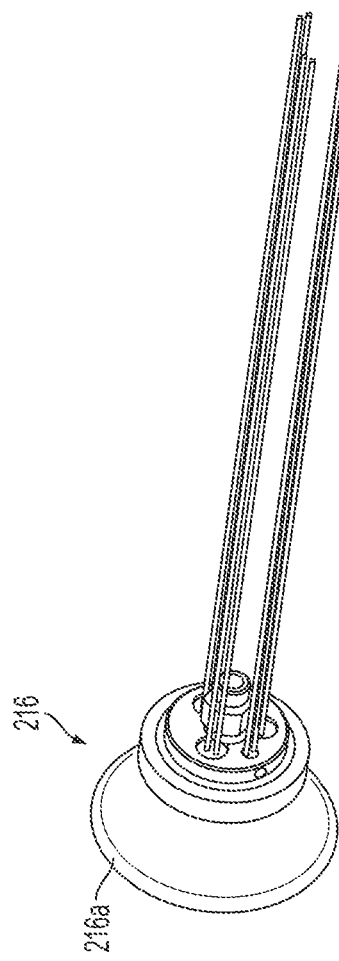
FIGS. 12a and 12b illustrate an example of a rotary sealing mechanism.
Figure 12B:
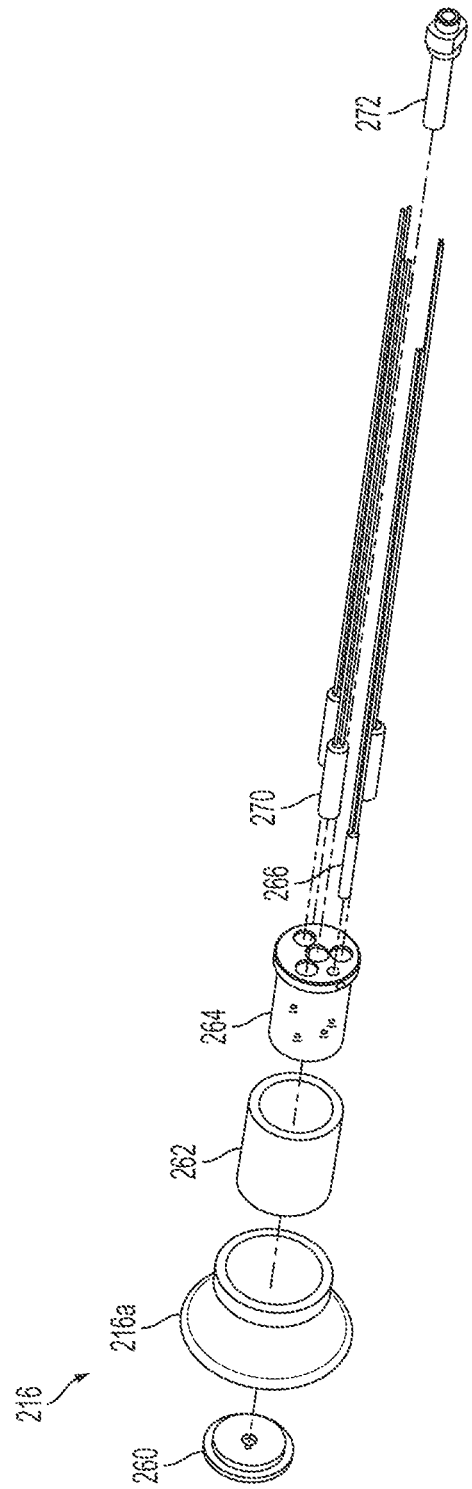

FIGS. 12a and 12b show an exploded view of the sealing mechanism in the apparatus of FIG. 8. A high temperature resistant bearing or bushing 262 fits into a hardened aluminum wheel 216. The bushing 262 is positioned over a stainless steel core body 264. Three heating elements 270 and a thermocouple 266 are positioned in openings in the core body 264. The components are secured together with a core body end cap 260 and a core mounting shaft 272.

Figure 15A:
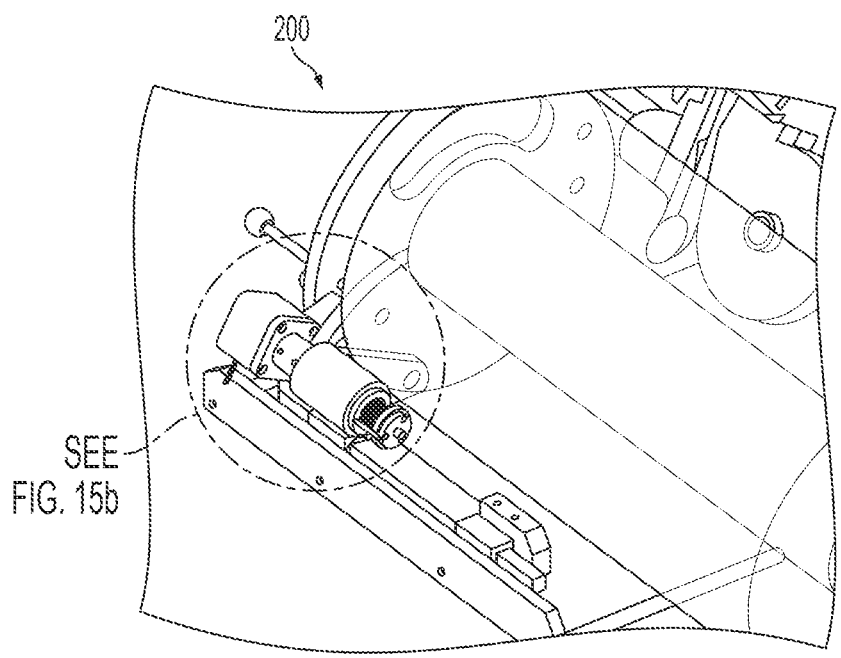
FIGS. 15a-15c illustrate a mechanism for controlling tension on a film supply roll during unwinding.
Figure 15B:
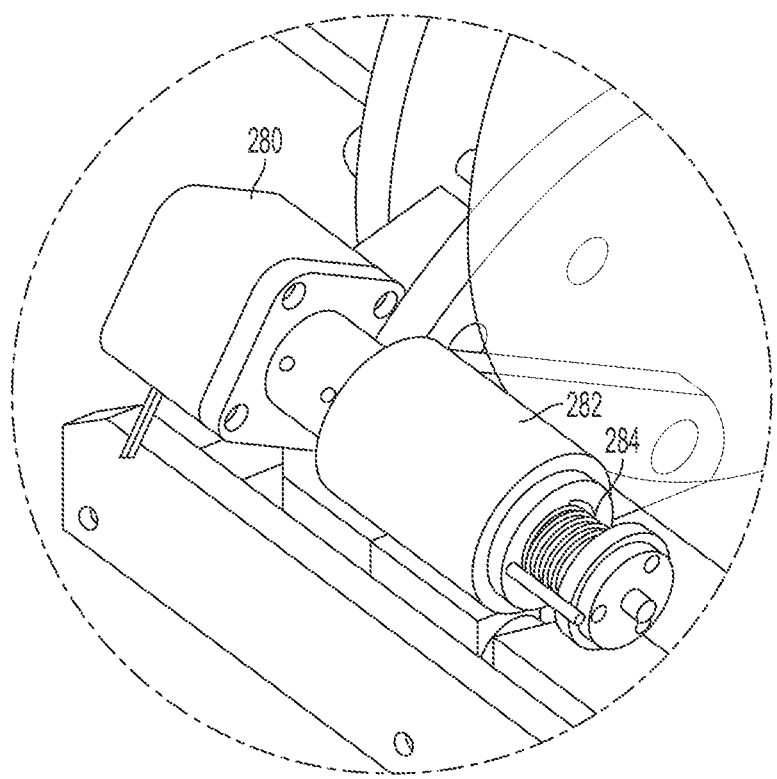
Figure 15C:
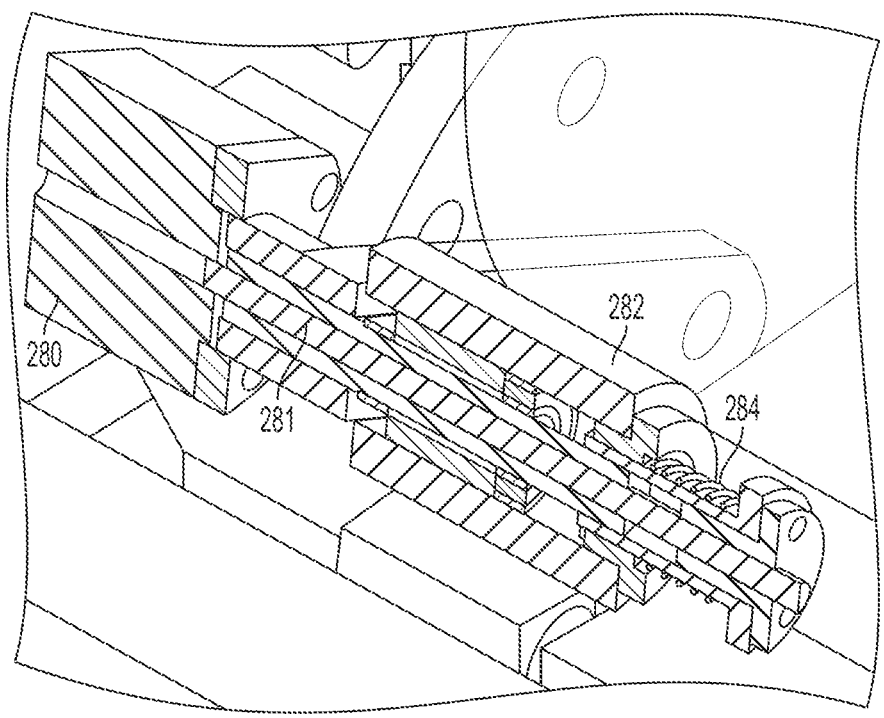

FIGS. 15a-15c illustrate a mechanism that may be used for controlling tension on the roll of film as it is unwound from the mandrel 205. The tension control mechanism includes a linear actuator 280, an actuator shaft 281, a nip roller 282 having a rubber surface, and a compression spring 284. The nip roller 282 contacts the outer surface of the roll of film as it unwinds. The linear actuator 280 causes the actuator shaft 281 to be displaced, thereby compressing or decompressing spring 284 to increase or decrease the amount of drag between internal disks and the hub of the nip roller 284. It may be desirable to control tension on the roll of film for a number of reasons. Tension on the film roll affects the presentation of the film to the inflation and sealing mechanisms, and the optimal amount of tension may vary for films having different cushion sizes and/or configurations. The tension control mechanism also may be used as a brake to stop unwinding of the film roll when operation of the machine is interrupted. The linear actuator 280 may be controlled by a suitable controller to adjust unwind tension in coordination with operation of the drive mechanisms and/or in response to characteristics of the film material that are either manually inputted into the device or automatically sensed by RFID technology as discussed more fully below.

Figure 1:
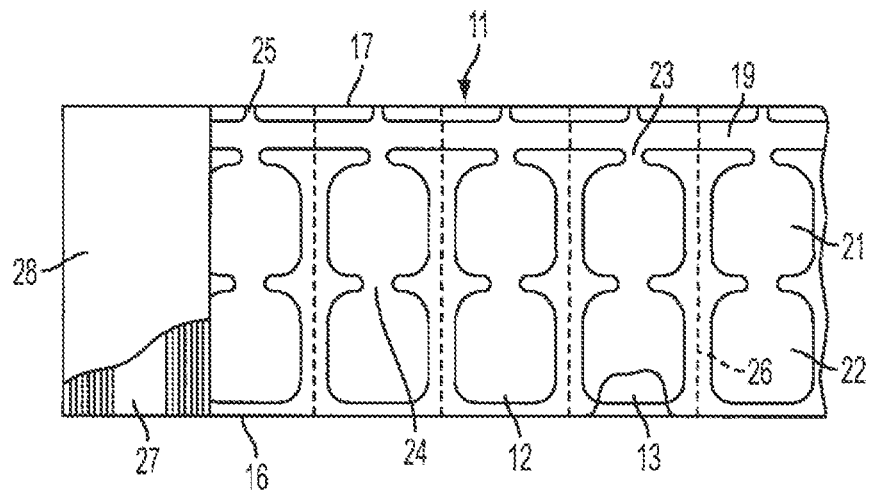
FIG. 1 is a plan view, partly broken away, of a preconfigured film material usable for making air-filled packing cushions.

The inflation and sealing apparatus may have any of a number of different configurations, several examples of which are described below. The preconfigured film material can have various configurations, such as having seal lines defining generally rectangular chambers as shown in U.S. Pat. No. 7,090,912 to Perkins et al. or U.S. Pat. No. 6,582,800 to Fuss et al., or undulating seal lines defining non-rectangular chambers, e.g., as shown in U.S. Pat. Nos. 6,410,119 and 6,761,960 to De Luca et al. By way of example, FIG. 1 shows a film having two layers 12, 13 of a suitable film material such as a polymer material including such materials as high density polyethylene or low density polyethylene. For example, the films may include any suitable polyolefin including, for example, a low density polyethylene, a homogeneous ethylene/alpha-olefin copolymer such as a metallocene-catalyzed ethylene/alpha-olefin copolymer, a medium density polyethylene, a high density polyethylene, a polyethylene terephthalate, a polypropylene, a nylon, a polyvinylidene chloride including one or more of a methyl acrylate or vinyl chloride copolymers of vinylidene chloride, polyvinyl alcohol, polyamide, or any suitable combination of the foregoing. Depending on the various applications, these films may have any suitable thickness such as from about 0.05 to about 25 mils. In most environments, the films will be between about 0.5 and 4 mils thick.

The material can be in the form of flattened tubing which is joined together, or closed, along both of its longitudinal edges 16, 17, or it can be open along one or both edges.

In the film material shown in FIG. 1, a single elongated sheet, or strip, of film material is formed, for example, by slitting an extruded bubble or by folding a web of material along its centerline to form edge 16. Other methods may be used for preparing the film material, such as by heat sealing overlying webs. The opposite edge 17 may be closed or open. In one embodiment, edge 16 is closed and edge 17 is open.

Again referring to FIG. 1, the two layers of film may be sealed together to form a longitudinally extending channel 19 and any number of suitably configured inflatable chambers 21, 22. The channel 19 may be variously configured along one or both edges and/or along the middle of the film. Where the channel extends longitudinally near one edge of the material, one or more chambers 21, 22 may be arranged in a generally transverse direction across the material either in a perpendicular direction to the channel or in an angular direction to the channel. Inlet openings 23 may be configured to extend between the channel 19 and one of the chambers. In these embodiments, it may be desirable for the openings 24 to interconnect the chambers. Optionally, a plurality of outlet ports 25 may be included to permit excess air to escape from the channel 19 during inflation and sealing. Where outlet ports are included, they may extend between channel 19 and the edge 17 of the material. The edge 17 may be unsealed in the region of the outlet port 25 to permit excess air to escape through the open edge 17. Alternatively, the edge 17 can be sealed, in which case excess air may be permitted to escape through perforations 26 extending laterally across the channel 19 and/or through the outlet ports 25. Other variations are possible. For example, some outlet ports 25 may be open at the edge 17 and other outlet ports 25 closed at the edge 17.

Optionally, generally transverse or diagonal rows of perforations 26 may extend about across the film between the chambers of successive cushions or groups of cushions to facilitate separation of the material either before or after the chambers are inflated. Alternatively, the perforations 26 can extend through the inflatable chambers 21, 22 and/or the outlet openings 25 to separate groups of cushions.

Figure 7:
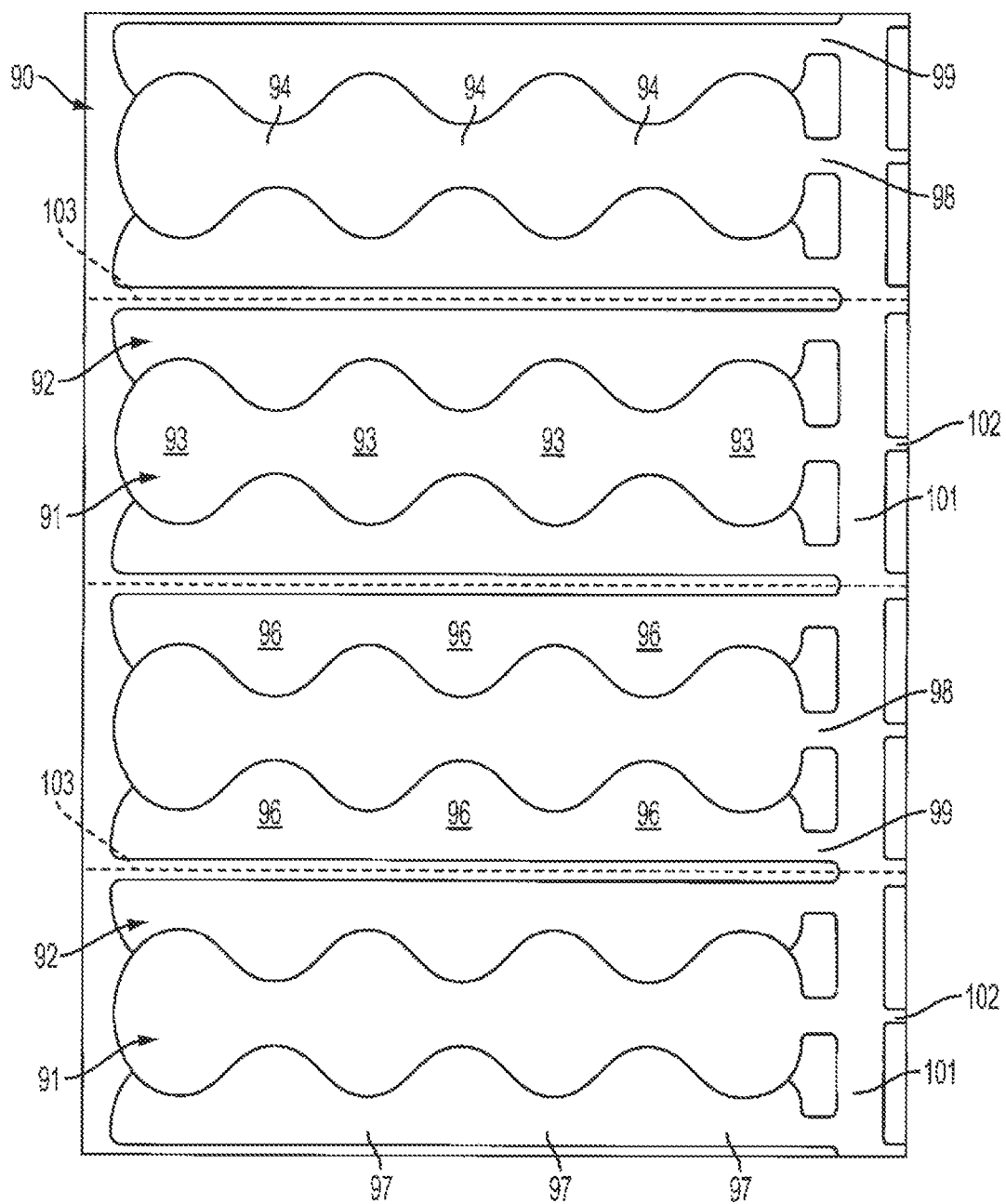
FIG. 7 is a plan view of another a preconfigured film material usable in making air-filled packing cushions.

In the film material illustrated in FIG. 7, each cushion 90 may have one or more full-size chambers 91 and optionally two or more partial-size chambers 92. The full-size chamber may be alternatively configured to have any number of discrete sections 93 (e.g., four) which may be positioned side-by-side across the film material, with openings 94 between them. Each half-size chamber may also have any number of sections 96 (e.g., three), with openings 97 between them.

Inlet openings 98, 99 may extend laterally between a longitudinally extending channel 101 and the first section in each of the chambers. Further, one or more outlet openings 102 may extend between the longitudinally extending channel and the exterior of the cushion. In one embodiment, the outlet openings extend to an adjacent edge of the film material. Perforations 103 may be provided between the cushions for use in separating them.

Figure 13:
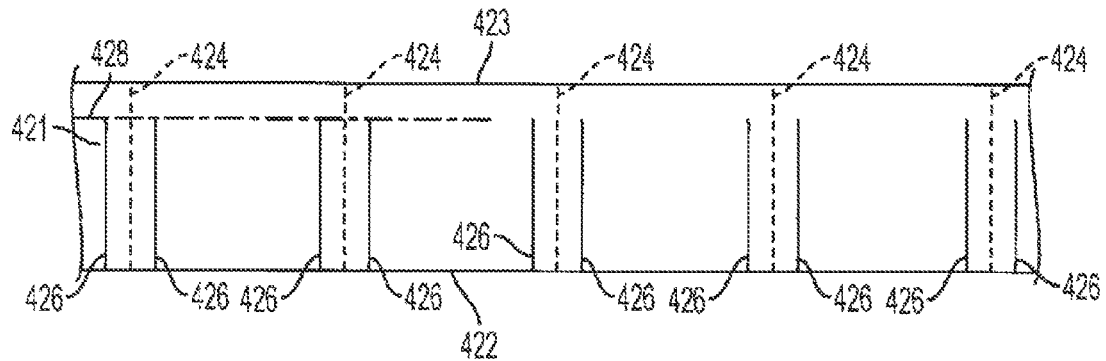
FIG. 13 shows a preconfigured film material having an open edge through which the chambers can be inflated.

FIG. 13 shows an example of a preconfigured film 421 as described in WO 00/43198. The film 421 can be folded along its centerline to form a closed edge 422 and an open edge 423. Transverse rows of perforations 424 are formed at regular intervals along the length and extend across the entire width of the material. The material is sealed together along seal lines 426 formed on opposite sides of the perforations 424. The seal lines extend from the closed edge 422 to within a short distance from the open edge 423. During inflation, air or other inflation gas is injected between the two layers, and a machine seals the layers together along a longitudinally extending seal line 428 to contain the air or other gas in the cushions.

Figure 14:
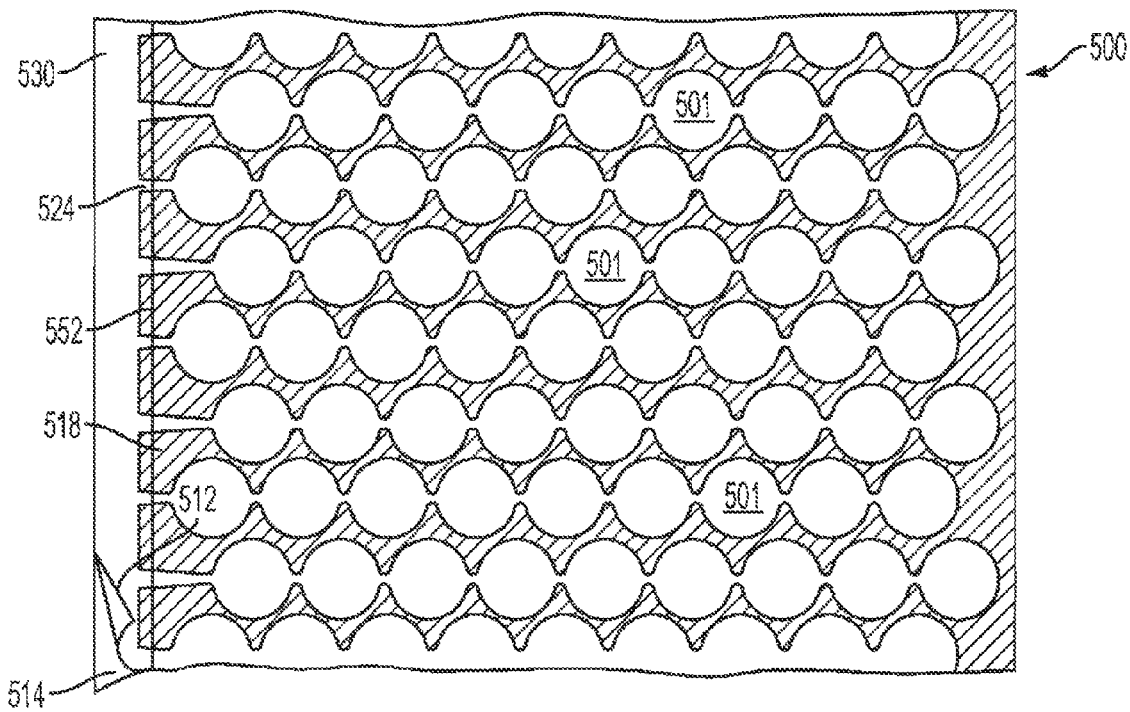
FIG. 14 is an alternative preconfigured film material having an open edge through which the chambers can be inflated.

FIG. 14 shows another example of a preconfigured film 500 that can be inflated through an open edge, as described in U.S. Pat. No. 6,982,113 B2. The film has two layers 512 and 514 sealed to each other in a pattern of seals 518, leaving unsealed areas which define the inflatable chambers 501 and inflation ports 524. The layers may be adhered by heat sealing or by use of an interposed adhesive. A pair of longitudinal flanges 530 are formed by the portion of the films 512 and 514 that extend beyond the inflation ports 524 and intermittent seals 518. The chambers 501 are inflated by injecting air through the flanges 530, and then a longitudinal seal 552 is formed to close off the inflated chambers 501.

The preconfigured film, such as any of the types shown in FIG. 1, 7, 13, or 14, may be wound into rolls or folded into boxes to form a supply that can be used with the inflation and sealing apparatus.

One or more of the aforementioned aspects of the invention may be utilized in combination with existing machines for inflating and sealing packing cushions, such as machines in which the path of the film can be generally horizontal, e.g., as shown in Perkins U.S. Pat. No. 6,209,286, or generally vertical, e.g., as shown in Perkins U.S. Pat. No. 6,659,150. An example of a machine that may be modified to include one or more aspects of the invention is illustrated in FIGS. 2-6, which an apparatus for inflating and sealing a preconfigured film material as described in U.S. Pat. No. 7,174,696. The apparatus may include a relatively small cabinet 31 which can be adapted to rest on a table top or other supporting surface. The cabinet has an L-shaped base 32 with an upstanding front wall 33, end walls 34, 36 and a removable cover 37 for the top and rear sides of the cabinet.

Figure 2:
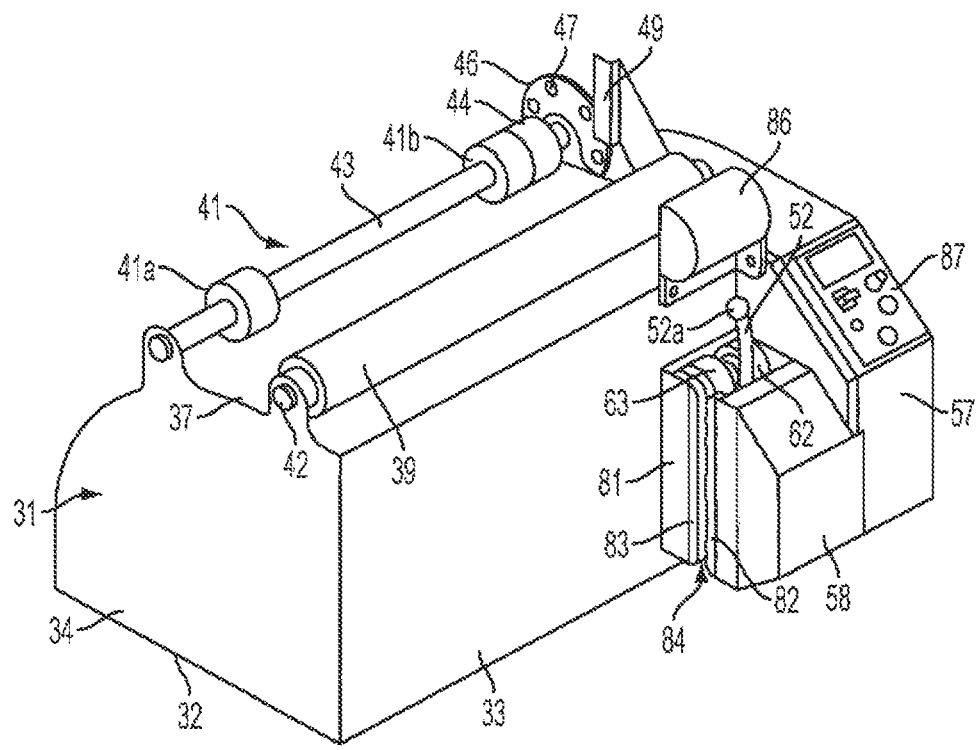
FIG. 2 is a perspective view of an apparatus for inflating and sealing air-filled packing cushions as described in U.S. Pat. No. 7,174,696.

In the apparatus shown in FIG. 2, a pair of spaced apart, horizontally extending rollers 39, 41 may be disposed on the machine such as mounted on the upper side of the cabinet for receiving the roll of preconfigured film material. The roll may be disposed to rest on the rollers and be free to rotate as the material is drawn from it. The gap between the rollers is usually less than the diameter of the core so that the roll will not drop between the rollers as it decreases in size. If desired, the axis of one or both of the rollers can be inclined slightly, e.g., up to about 10 degrees, in order to keep the roll against a stop toward one side of the machine.

Again referring to FIG. 2, roller 39 may be rotatively mounted on a stationary shaft 42 which extends between end walls 34, 36 near the front the cabinet. Roller 41 may include two relatively short rollers 41a, 41b mounted on a rotatively mounted shaft 43 to the rear of roller 39. The rollers 41a, 41b may be positioned toward opposite sides of the machine for engagement with the roll of film material toward the edges of the roll. A roller 44 may be mounted on shaft 43 next to roller 41b and directly beneath longitudinally extending channel 19 in the preconfigured film. A disk 46 is also mounted on shaft 43, with openings 47 which may be detected optically to monitor rotation of the roll and the removal of material from it.

In the apparatus shown in FIG. 2, a stop 49 may be located toward one side of the cabinet and may be configured to as a guide for positioning the roll on the rollers. Where a stop is used, the roll may be placed on the rollers with the edge adjacent to the longitudinally extending channel 19 abutting against the stop 49 so that the channel 19 and the inlet openings 23 may be in the same position regardless of the width of the roll. As noted above, one or both of the rollers can be inclined down toward the side of the cabinet where the stop is located to help keep the roll against the stop. With one or both of the rollers inclined in this manner, they are still substantially horizontal, and the axis of the roll is still substantially parallel to the axes of the rollers. The roll can be of any desired width, and it can even overhang the side of the cabinet opposite the stop as long as it is not so wide that the weight of the overhang causes the roll to tip or be unstable on the rollers.

Figure 3:
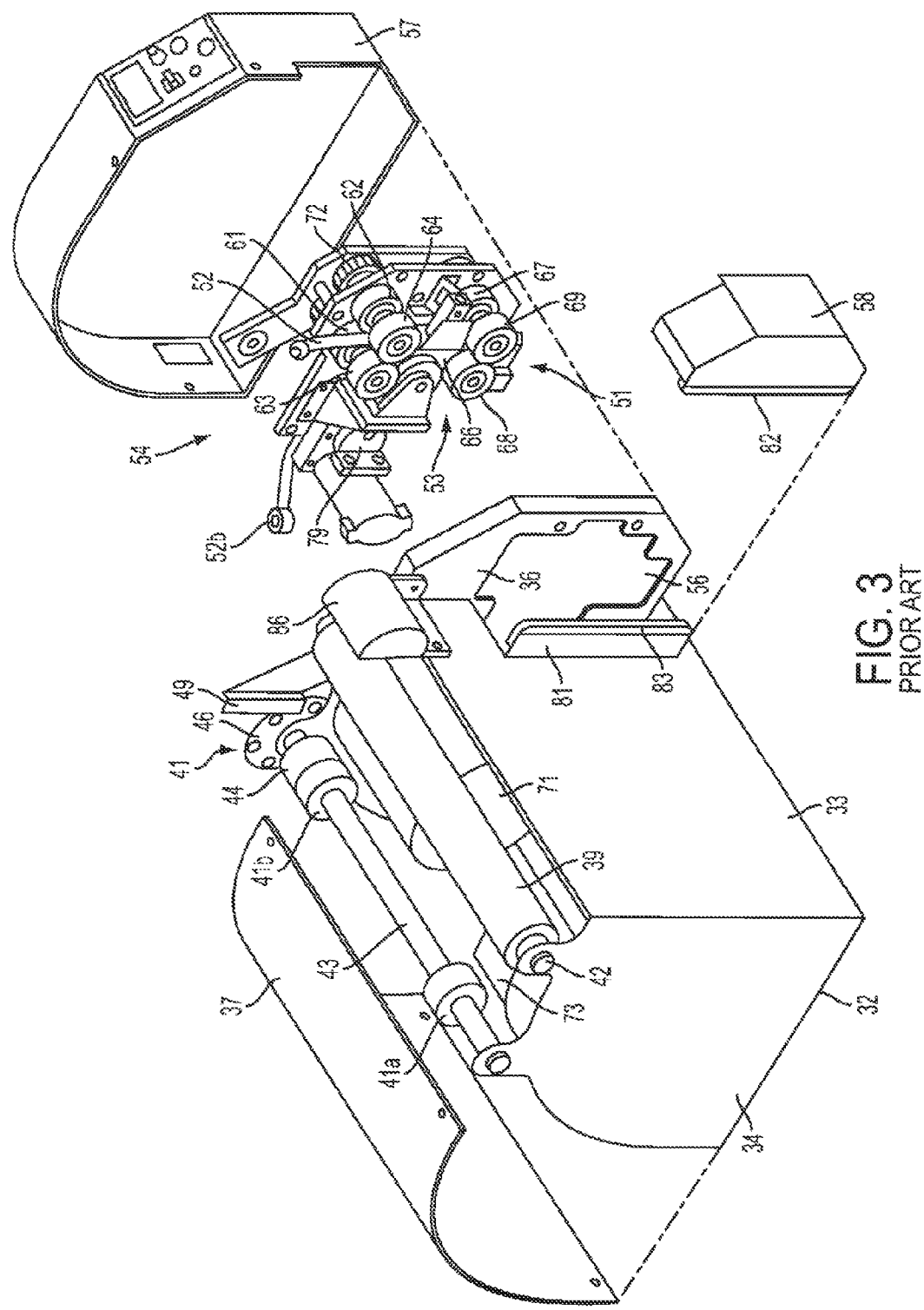
FIG. 3 is an exploded perspective view of the apparatus shown in FIG. 2.

A drive mechanism 51, an elongate member 52 and a sealing assembly 53 may be combined into a single modular unit 54 which may be located toward the front of the machine. As shown in FIG. 3, the modular unit 54 can be removably mounted on the outer side of end wall 36, and projects through an opening 56 in that wall, with an end cover 57 and a front cover 58 enclosing portions of it.

Still referring to FIG. 2, cover 58 may terminate just in front of the path traveled by the film material in passing through the feed rollers and sealing assembly. A flange 81 may extend from the front wall of the cabinet in alignment with the left side of the cover and terminate just to the rear of the film path. The apparatus may also include guide shoes 82, 83 mounted on the confronting edges of the cover and flange to define an access opening 84 for the film material and to help guide the material into the feed rollers. Additionally, a guide 86 may be positioned toward the front of the cabinet above the elongate member and feed rollers to guide the film material toward them.

A control panel 87 may be located in any suitable position such as on an inclined portion of end cover 57 to the right of the drive module. This panel may include various controls such as controls for turning the machine on and off and for controlling various operational functions such as number and firmness of cushions being made. In addition, the control panel 87 may include controls for adjusting various operating parameters in response to data received from the supply of film, as discussed more fully below.

Operation and use of the machine can be described with reference to FIG. 6. The roll of preconfigured film material 28 may be placed on rollers 39, 41, with the longitudinally extending channel side of the roll 19 abutting against stop 49, so that the longitudinally extending channel itself is aligned with nip roller 44 and elongate member 52. Other feed mechanisms, such as a cantilevered feed roll mechanism, also may be used.

Figure 6:
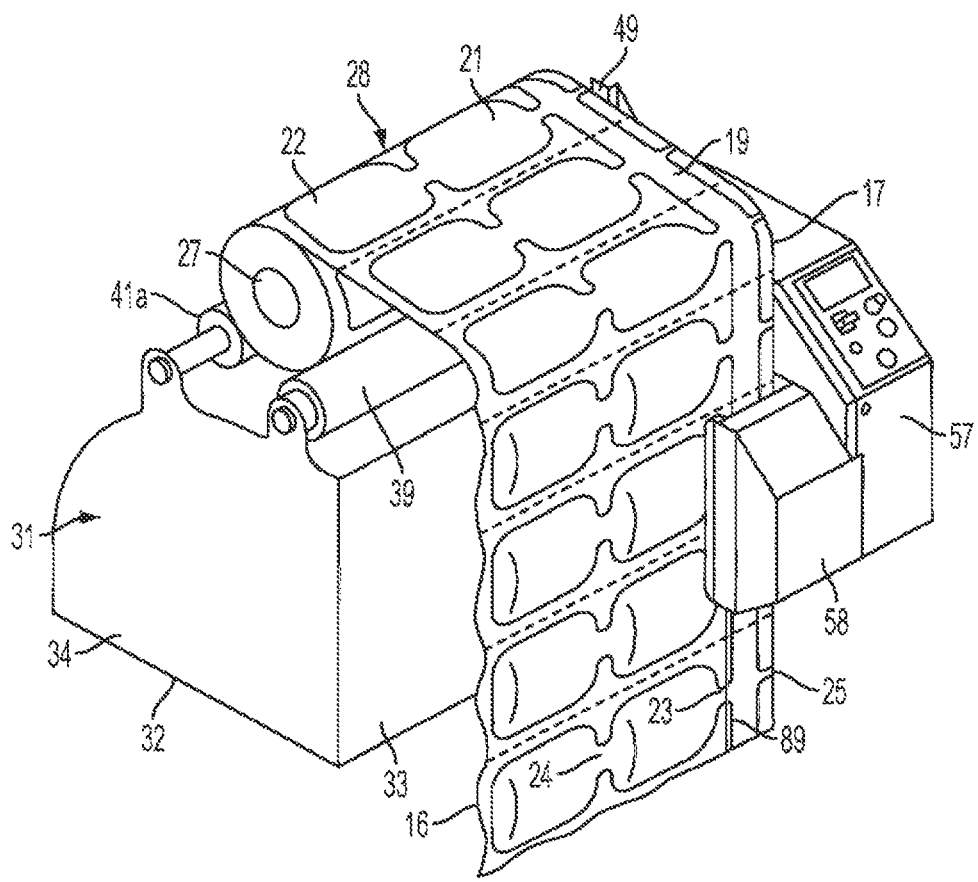
FIG. 6 is an operational view of the apparatus of FIG. 2 transforming a preconfigured film material into air-filled packing cushions.

Still referring to FIG. 6, the free end of the film material may be pulled down over guide 86 (shown in FIG. 3) and onto a guide such as the elongate member which extends into the longitudinally extending channel 19. Once over the guide, it may be desirable for an operator to continue to pull down on the material until it engages the upstream feed rollers and is thereafter fed by the rollers. The guide or elongate member performs the function of guiding and keeping the film material properly aligned with the rollers.

As the film material travels past the guide such as the elongate member, air or another suitable gas may be injected into the film using any suitable mechanism either incorporated into the guide or separate from the guide. Where a gas is injected by the guide, it may be injected using a nozzle in the guide. Where air is injected from a location or nozzle disposed external to the guide, it may be preferable to position the source of the air injection port near the feed path of the film. In either case, a gas may be injected through openings such as openings 23, 24 and into chambers such as the chambers 21, 22 discussed above. The gas may be confined the portion of the film between the air injection apparatus and where it is pinched off by roller 39 and/or roller 41*b*. Depending upon the diameter of the roll, the film material may be withdrawn from the roll at about 90 to 180 degree angle from the point where the longitudinally extending channel is pinched closed by the roller.

The guide may be variously configured. In one embodiment shown in FIG. 2, the guide includes an enlarged bulb 52*a* at the upper end of an elongate member. The bulb 52*a* may be configured to facilitate movement of the film material over the end portion of the elongate member and to prevent air from escaping back along the elongate member from the longitudinally extending channel. A fitting 52*b* may be provided at the other end of the elongate member for connection to an air pump.

Figure 4:
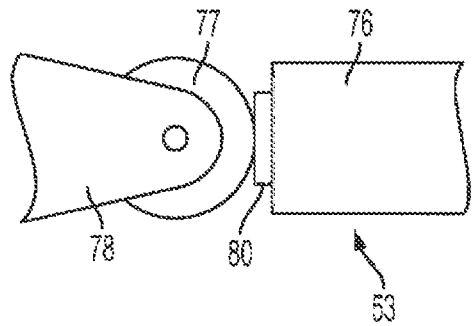
FIG. 4 is a fragmentary side elevation view of the sealing unit in the apparatus shown in FIG. 3.

With reference to FIGS. 3, 4, and 6, following inflation, the film material may be configured to travel through sealing assembly 53 where roller 77 presses the material into contact with heating element 76. The layers of film material (e.g., two) may be fused together along a relatively narrow seal line 89 which may be configured to extend longitudinally along the film material and across inlet openings 23 to seal the chambers.

The apparatus may be configured to utilize a slitting mechanism such as a knife to slit the film. For example, a slit may be formed in the channel of the film. For example, the slitting mechanism may be configured to slit the film after the guide has been in contact with the film. The slitting mechanism may be positioned either before or after the air inlet. In one embodiment where the slitting mechanism is positioned after the point in the apparatus where the cushion is inflated and sealed, the film material travels past the knife which slits open the edge of the material next to the longitudinally extending channel so the elongate member can exit from the channel. Other embodiments may slit the film before inflation. Still further embodiments may slit the film at the same time as inflation.

In embodiments where the feed rollers and the elongate member engage only one edge portion of the film material, the machine can process materials of any desired width to make cushions having any desired number of chambers, including cushions having a single chamber that extends the full width of the material.

The drive mechanism shown in FIG. 3 may include various guide rollers such as upstream rollers 61-64 and downstream rollers 66-69. Where included, these rollers engage the edge portion of the film material and feed it through the machine. The upstream and downstream rollers may be arranged in dual sets for engaging the film material on opposite sides of the longitudinally extending channel. In these embodiments, upstream rollers 61, 62 and downstream rollers 66, 67 engage the film material between the longitudinally extending channel and the edge of the material, whereas upstream rollers 63, 64 and downstream rollers 68, 69 engage it between the channel and the chambers. The feed rollers may be driven by any suitable mechanism such as motor 71 which may be mounted inside the cabinet. The motor may include one or more drive gears, pulleys, or other suitable mechanisms on the motor shaft which may be coupled to driving gears 72, pulleys, or other suitable mechanisms affixed to the shafts on which the rollers are mounted.

Elongate member 52 may be positioned between the inner and outer feed rollers and may extend in an upward direction. Optionally, it may curve inwardly as shown in FIGS. 2 and 3, for insertion into the longitudinally extending channel of the film material. Air or another suitable gas may be supplied to the air injector, typically at a pressure on the order of 0.5 to 10 psig by pump such as air pump 73. The pump may also be mounted inside the cabinet. If desired, a regulator (not shown) can be connected between the pump and the air injector to allow users to adjust the air pressure and, hence, the degree of firmness to which the cushions are inflated.

Figure 5:
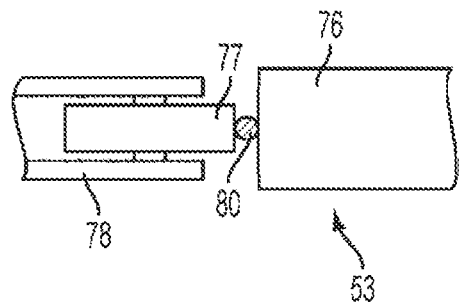
FIG. 5 is a fragmentary cross-sectional view of the sealing unit of FIG. 4.

In the device illustrated in FIGS. 3-5, the sealing assembly 53 may be positioned between the upstream and downstream rollers. The sealing assembly may include one or more heating elements 76 and one or more backing elements which press the film material against the heating element. The heating element may be mounted in a stationary position, and the roller may be mounted on a carriage 78. In this embodiment, the roller is pressed against the heating element by a cam 79 when the machine is operating, and withdrawn from the heating element when the machine is idle. This withdraw of the heating element from the backing element while not in operation prevents the heating element from burning the plastic and overheating the backing element. As shown in FIGS. 4 and 5, the heating element may include a stainless steel rod 80 of relatively small (about ⅛ inch) diameter. The rod 80 may be configured to extend vertically (or parallel to the direction of film travel) and perpendicular to the axis of the backing roller 77.

Figure 18:
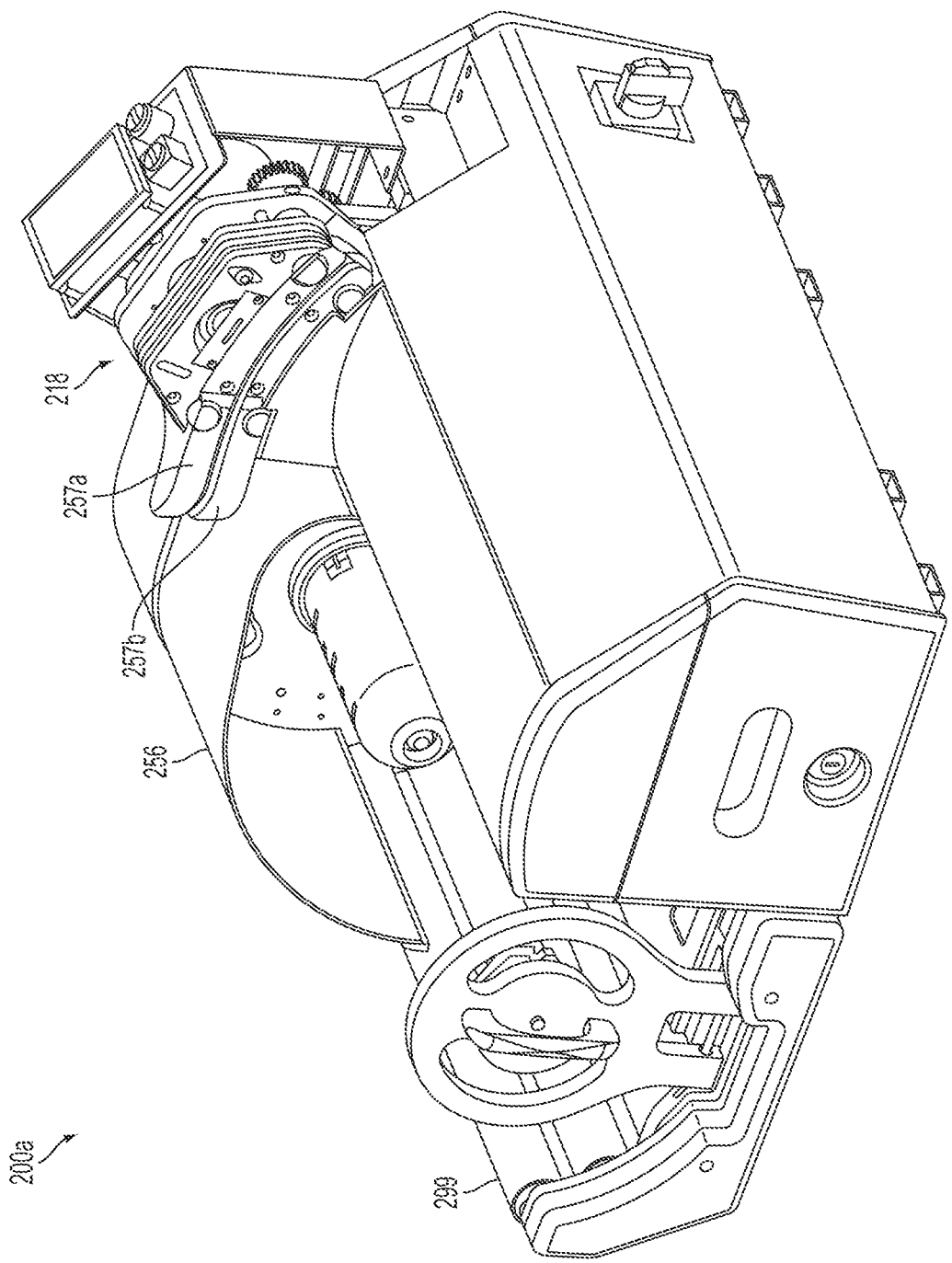
FIG. 18 is a front perspective view of an apparatus for inflating and sealing air-filled packing cushions in accordance with an alternative embodiment of the invention.
Figure 19:
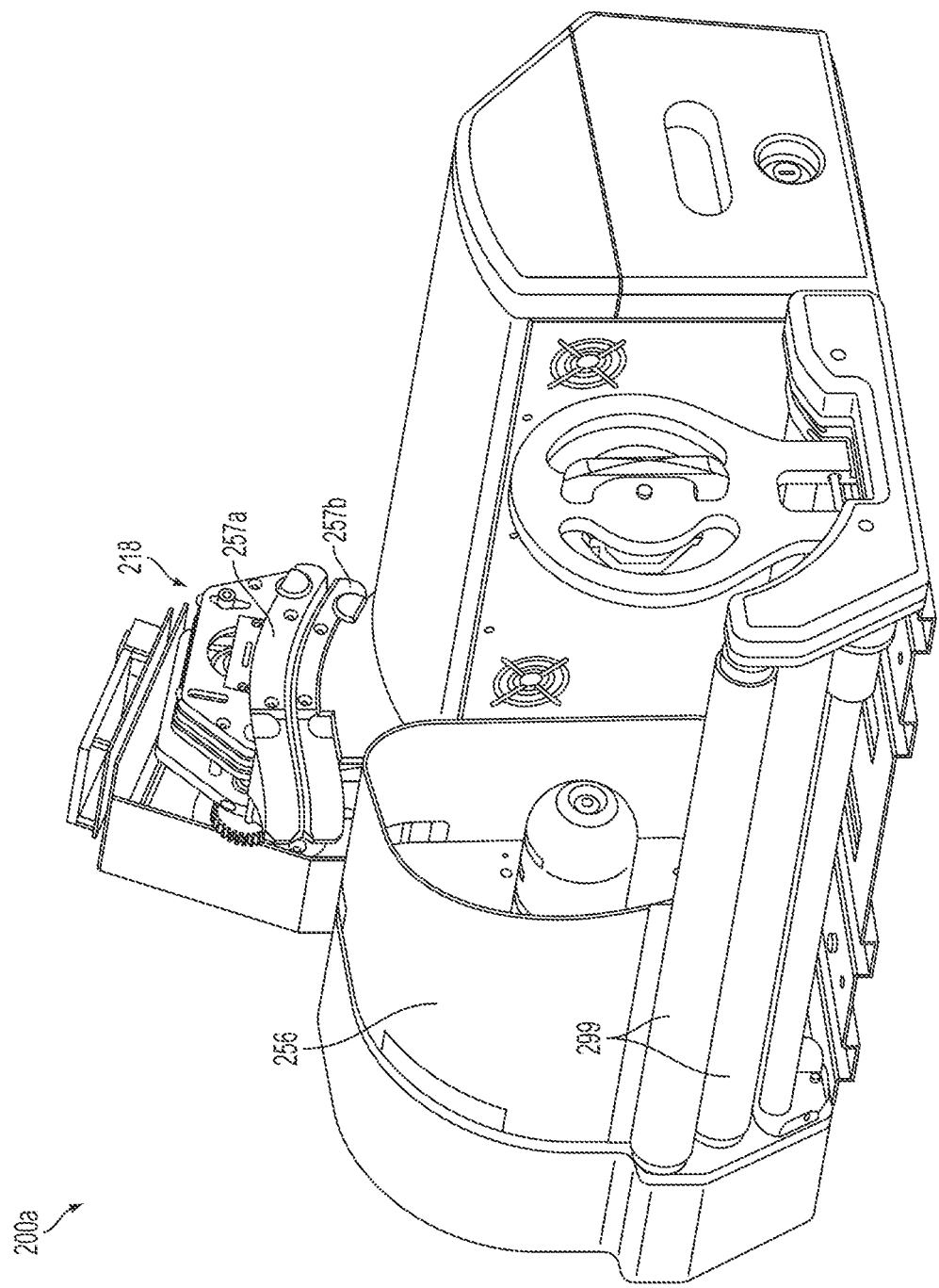
FIG. 19 is a rear perspective view of the apparatus of FIG. 18.

FIGS. 18 and 19 show an apparatus 200*a* for inflating and sealing air-filled packing cushions in accordance with an alternative embodiment of the invention. Instead of having a guide roller 255 as previously described, a fixed guide member 256 is provided for guiding the film from the supply to the belt drive assembly 218. The fixed guide member 256 may be constructed of sheet metal or other suitable material such as a rigid plastic. As shown in FIGS. 18 and 19, the fixed guide member 256 may have a generally curved exterior surface that surrounds or partially surrounds the roll of film material on the mandrel.

Also as shown in FIGS. 18 and 19, instead of having an adjustable tensioning mechanism such as nip roller 282 as previously described, apparatus 200*a* has pair of compressed nip rollers 299 through which the film material is passed after it is unwound from the supply roll. The nip rollers 299 may be covered with a resilient material, such as rubber, and may span the entire width of the film material. By nipping the film material in this fashion, a constant approach angle of the film material is maintained to the inflation and sealing assembly, e.g., the approach angle does not vary as the diameter of the film roll decreases as the film material is unwound. Also, the location of the nip rollers 299 as shown allows the inflatable gas to be injected into the chambers upstream all the way to the nip rollers 299, which in turn provides greater pre-inflation volume and faster restart times between inflation cycles. After the film material passes between the nip rollers 299, it is fed over the exterior surface of the fixed guide member 256 to the belt drive assembly 218.

Figure 20:
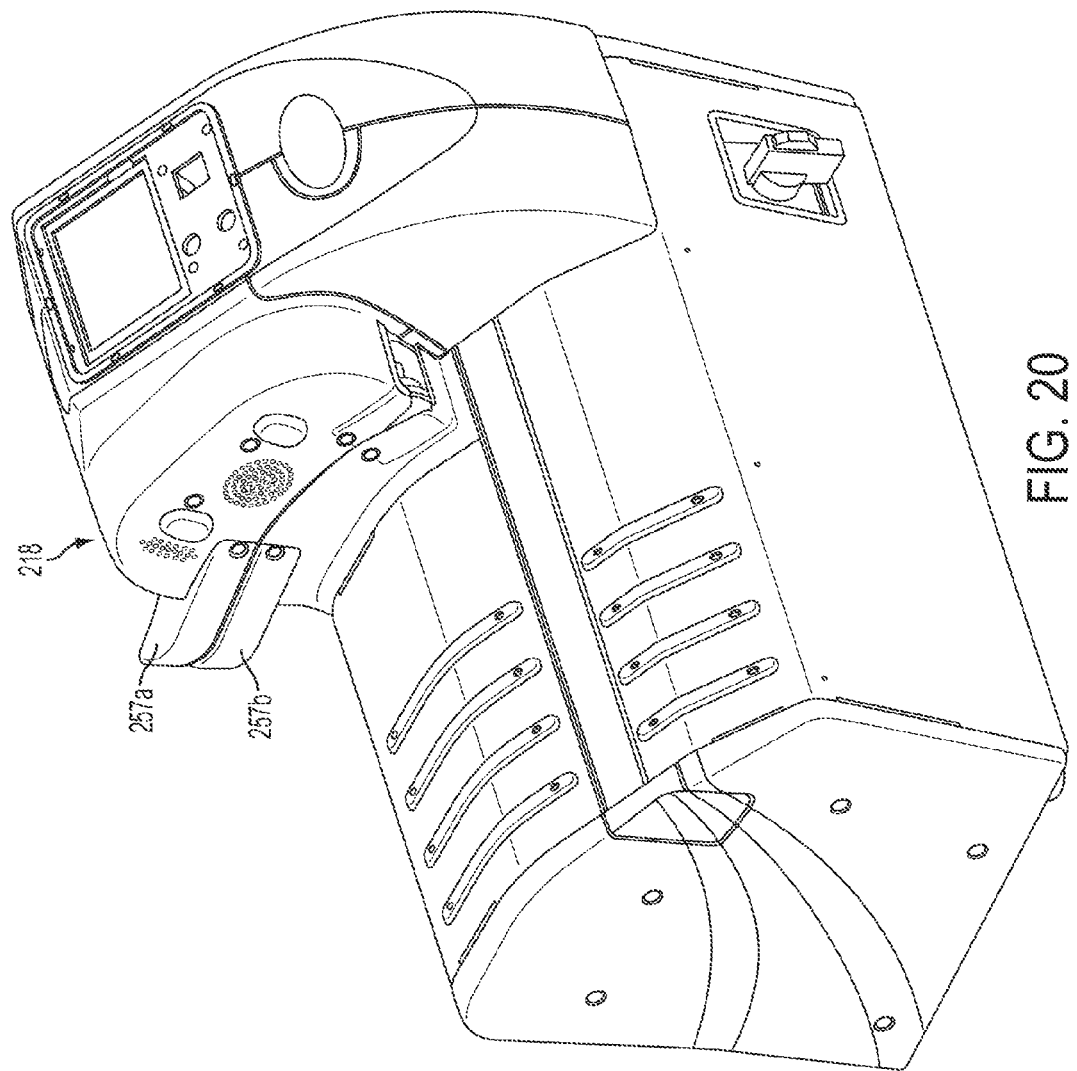
FIG. 20 is a front perspective view of an alternative apparatus for inflating and sealing air-filled packing cushions.

FIGS. 20-23 show an apparatus for inflating and sealing packing cushions according to an alternative embodiment. The apparatus is generally similar to the apparatus shown in FIGS. 8-12 and discussed above, with like reference numerals corresponding to like structures. FIG. 20 is a perspective view of the apparatus with the covers in place. As in the previous embodiment, upper 257a and lower 257b film edge guides may be provided for aligning the film with the inflation and sealing mechanisms located within the drive assembly 218.

Figure 21:
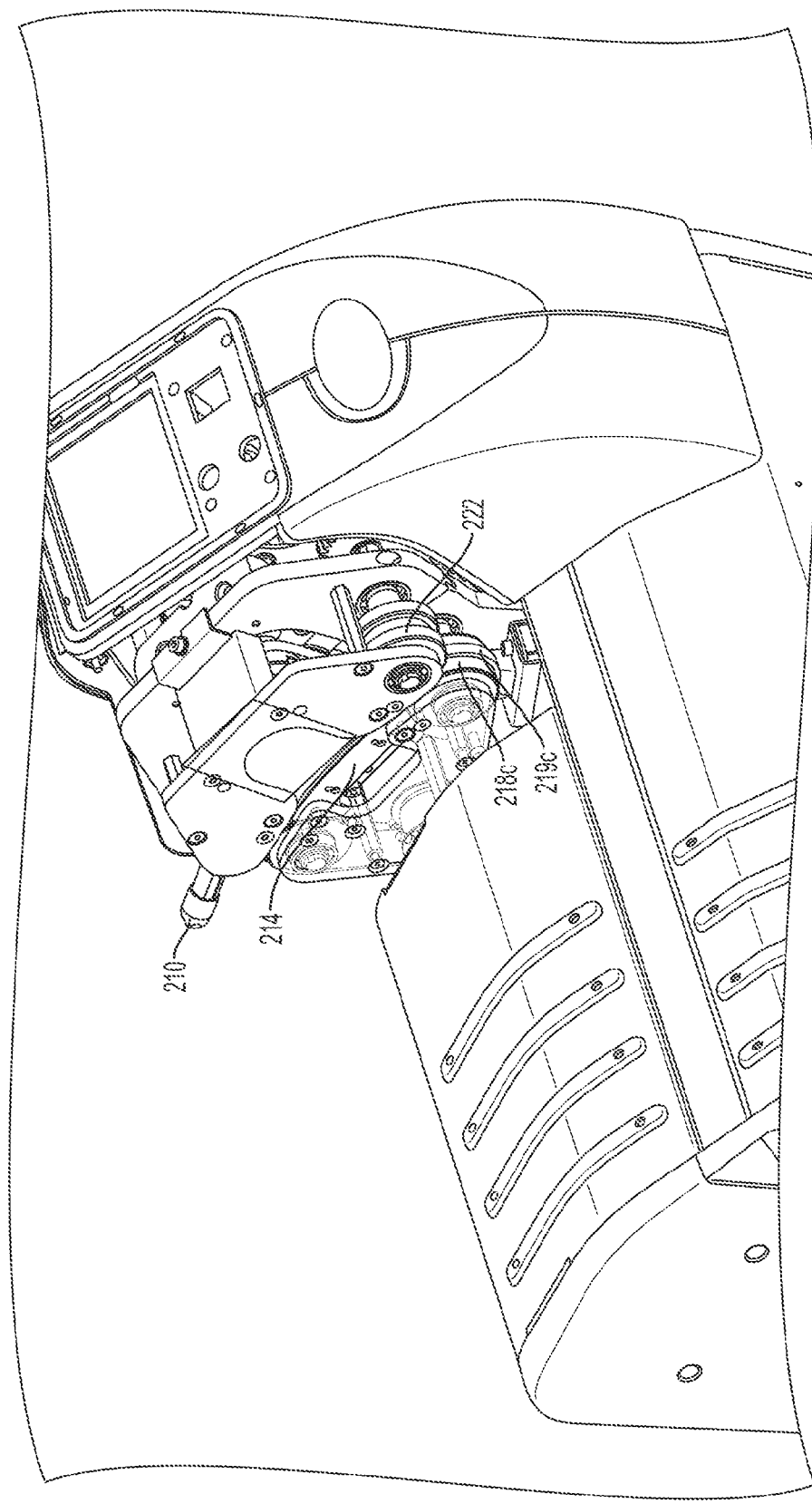
FIG. 21 is a front perspective view of the apparatus shown in FIG. 20 with the sealing assembly partially exposed.

FIG. 21 shows the sealing assembly partially exposed. Similar to the previously described embodiments, the backing element comprises a lower belt 218c having a rib 219c of rectangular cross-section running along its length. The rib 219c engages a corresponding groove in the drive roller 222 to guide and prevent slipping of the belt 218c along the drive roller 222.

Figure 22:
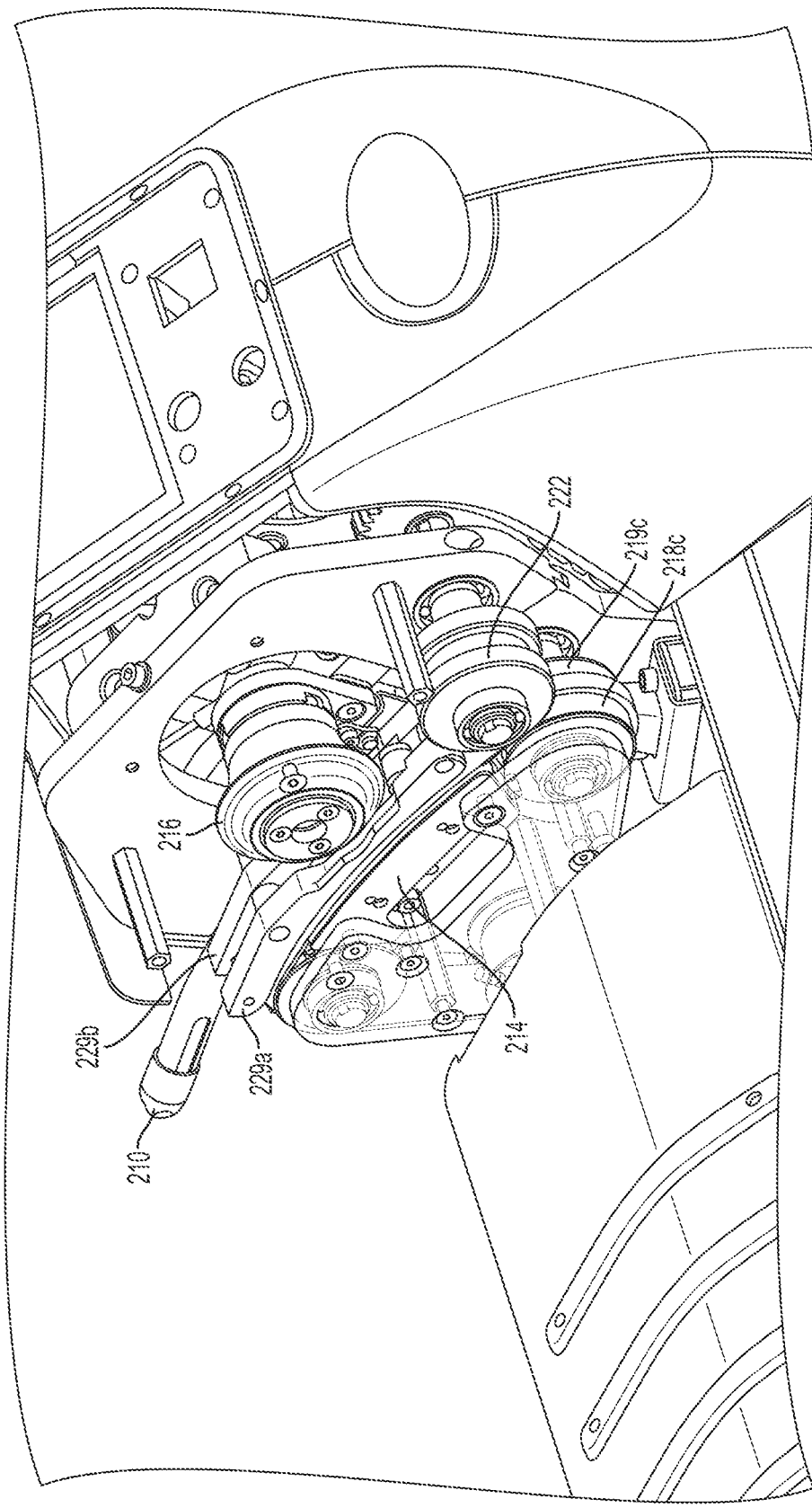
FIG. 22 is a detailed view of the sealing assembly of the apparatus shown in FIG. 20.

With reference to FIG. 22, the apparatus of this embodiment differs in that first and second stationary guide members or "skis" 229a and 229b are used instead of first and second upper drive belts as in the previous embodiment. As can be seen in FIG. 22, the first and second stationary guide members 229a and 229b may extend from a point where the film contacts the lower belt 218c (near the upper left-hand portion of FIG. 22) and ending shortly before the film is engaged by the drive roller 222. A rotary sealing mechanism 216 is positioned such that a sealing element 216a contacts the film in a sealing region located between the first and second stationary guide members 229a and 229b to form a longitudinal seal to trap inflation gas in the chambers. A support surface 214, which may be a block constructed from aluminum or other metal as previously described, is positioned underneath the lower belt 218c to provide an anvil surface against which the lower belt 218c is deflected by pressure from the sealing mechanism 216. Other details of support surface 214 and sealing mechanism 216 may be as previously described in connection with previous embodiments.

Figure 23:
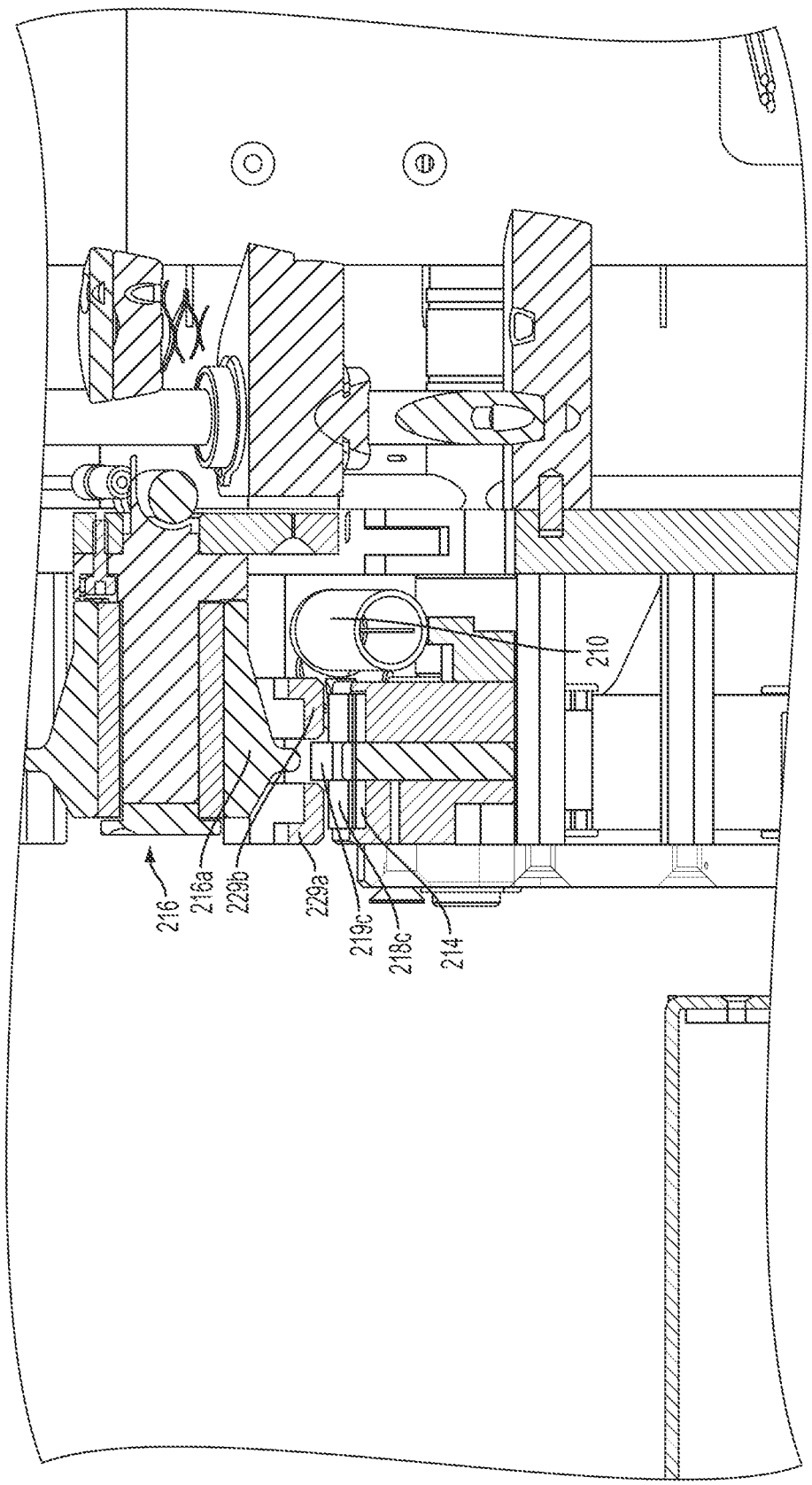
FIG. 23 is a cross-sectional view of the sealing mechanism and inflation mechanism of the apparatus shown in FIG. 20.

FIG. 23 is a cross-sectional view showing the rotary sealing mechanism 216 which has a relatively narrow convex portion forming a sealing element 216a around its circumference; the guide/air injector 210; the support surface 214; the first and second stationary guide members 229a and 229b; and the lower belt 218c. A knife blade (not shown) may be located along the guide/air injector 210 for slitting the film to permit continued movement of the film past the sealing area. The inflated cushions are heat-sealed as the film passes between the sealing mechanism 216 and the lower drive belt 218c.

Similar to previous embodiments, the lower belt 218c may have a crowned surface 219c such that the sealing region of the film (e.g., the portion of the film positioned directly below the sealing element 216a) is raised relative to the adjacent portions of the film. Alternatively, the belt 218c may be crowned in a different (e.g., opposite) configuration to flatten the film in the sealing region by pulling the film outwardly relative to the sealing region. The stationary guide members 229a and 229b together with the crowned drive belt 218c present the film to the sealing mechanism 216 in a smooth, flattened state without wrinkling of the film material. This embodiment essentially achieves similar results to the previous embodiment employing a pair of upper drive belts, while advantageously reducing the number of moving parts in the machine. As a result, there may be fewer and/or less severe instances of film jamming as compared to prior configurations.

Figure 24:
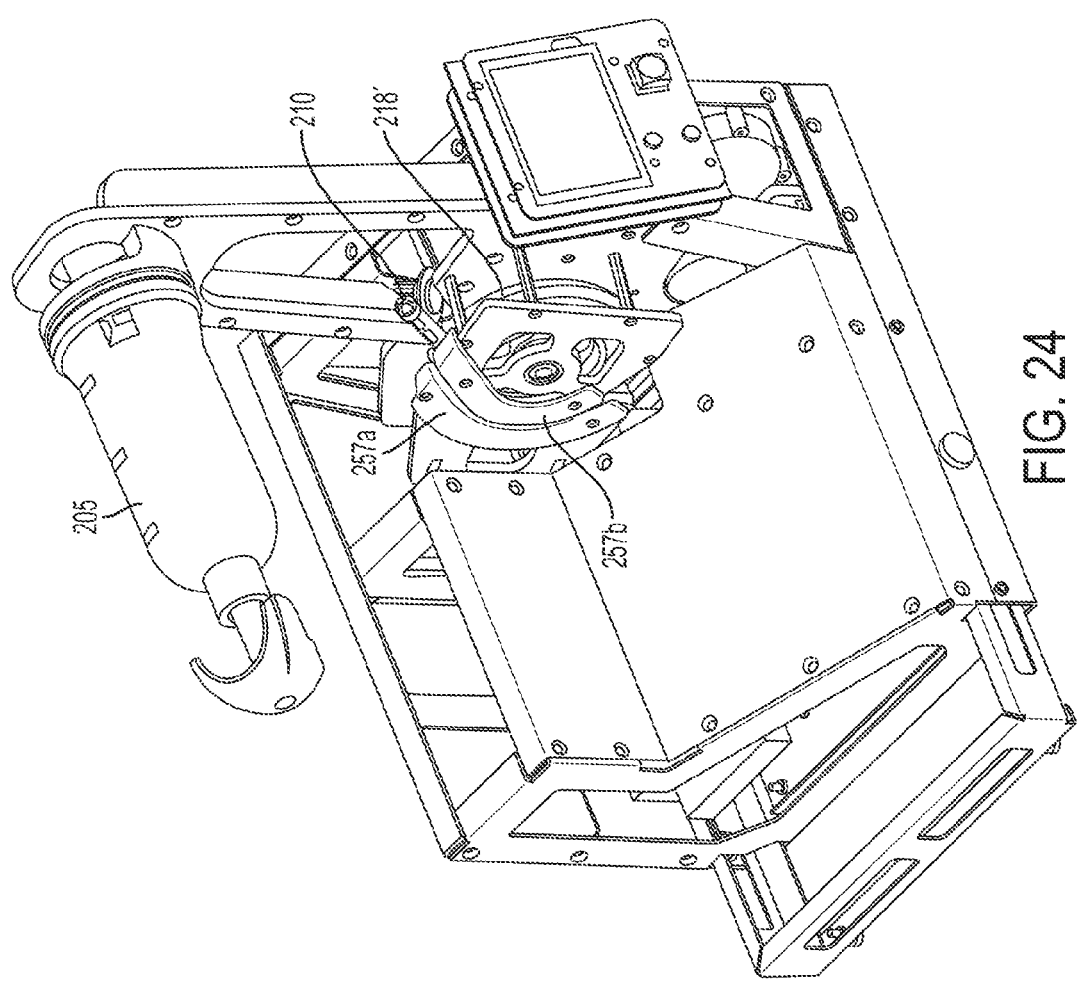
FIG. 24 is a front perspective view of an apparatus for inflating and sealing air-filled packing cushions according to an alternative embodiment.
Figure 25:
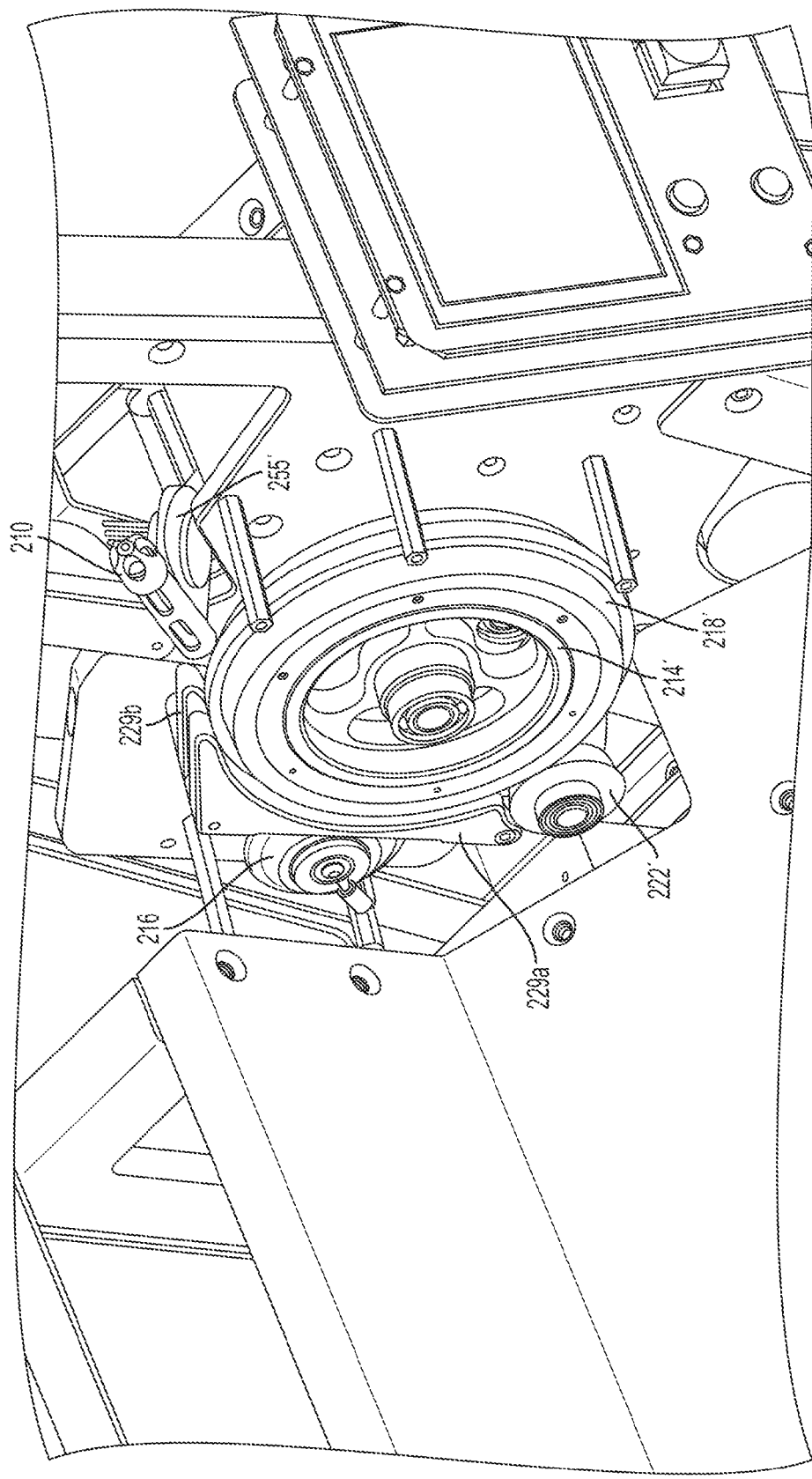
FIG. 25 is a detailed view of the sealing assembly of the apparatus shown in FIG. 24.
Figure 26:
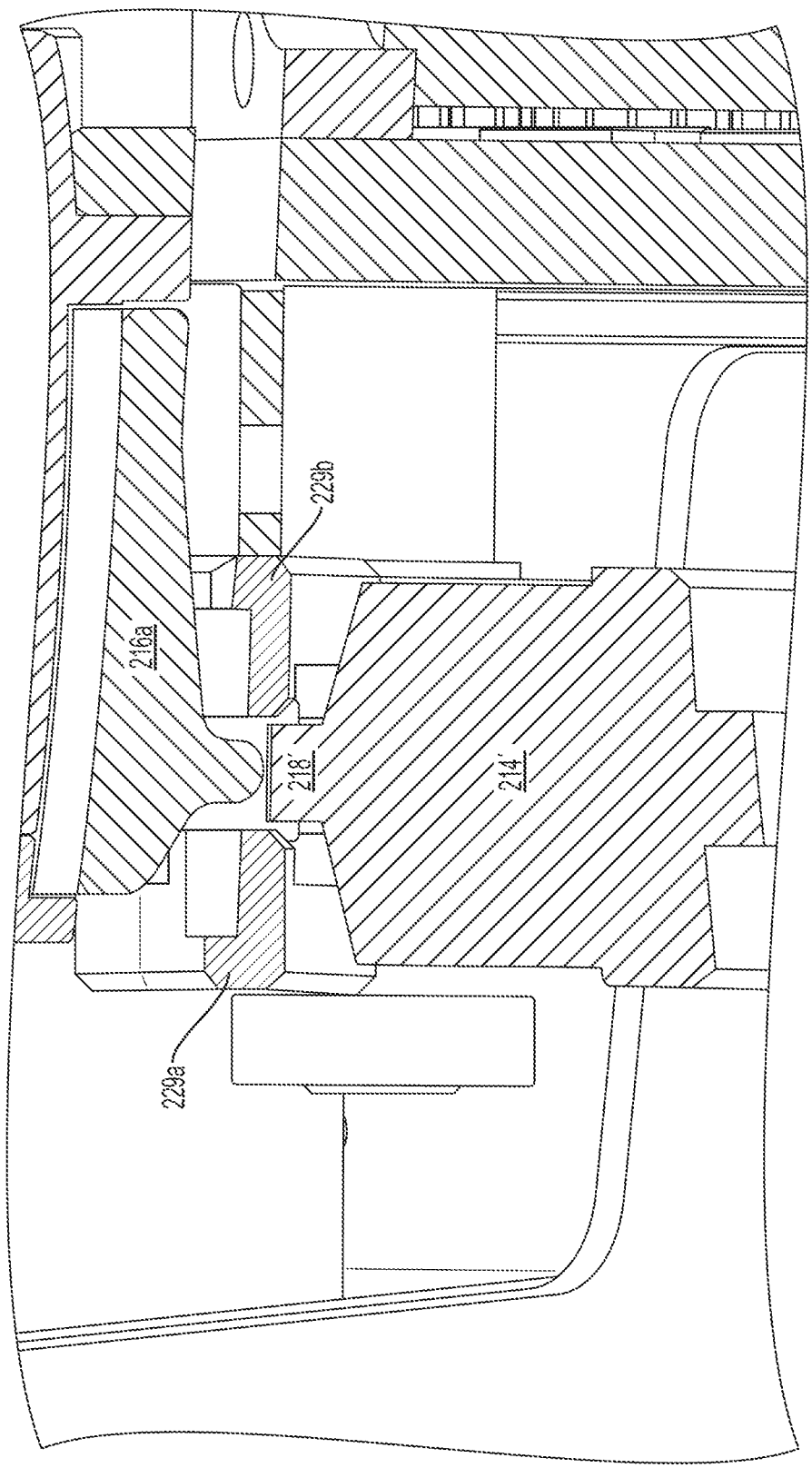
FIG. 26 is a cross-sectional view of the sealing mechanism and inflation mechanism of the apparatus shown in FIG. 24.

FIGS. 24-26 show yet another embodiment of an inflation and sealing apparatus featuring a compact, simplified construction. As shown in FIG. 24, a mandrel 205 for holding a roll of film material (not shown) is positioned above the guide/air injector 210 and sealing assembly. With reference to FIG. 25, the film is fed onto the guide/air injector 210 with the assistance of guide wheel 255'. The film passes between film edge guide members 257a and 257b which define a generally arcuate path, as can be seen in FIG. 24.

As shown in FIG. 25, this embodiment differs from the embodiment of FIGS. 20-23 primarily in that a backing wheel 214' having a rubber-coated surface 218' is used in place of a lower belt. The wheel 214' may be driven by a motor or, as depicted in FIG. 25, may be freewheeling and driven by drive wheel 222 that frictionally engages the rubber-coated surface 218'. The drive wheel 222 may have a groove that receives a crowned portion of the rubber surface 218' of rectangular cross-section, similar to that described in previous embodiments.

First and second stationary guide members or "skis" 229a and 229b are positioned along a portion of the circumference of backing wheel 214' in the vicinity of the rotary sealing mechanism 216, as shown in FIG. 25. The stationary guide members 229a and 229b are analogous to the stationary guide members shown in the embodiment of FIGS. 20-23 except that the stationary guide members 229a and 229b of this embodiment have an arcuate shape that follows the circumference of the wheel 214'. As shown in FIG. 26 (and similar to the embodiment of FIGS. 20-23), the stationary guide members 229a and 229b together with the crowned surface 218' of the backing wheel 214' present the film to the sealing mechanism 216 in a smooth, flattened state without wrinkling of the film material, to reliably form a longitudinal seal to trap inflation gas within the chambers. The surface wheel may have a raised surface 218' as shown or, alternatively, the surface 218' may be crowned in a different (e.g., opposite) configuration to flatten the film in the sealing region by pulling the film outwardly relative to the sealing region, as described in connection with previous embodiments.

Details of the sealing mechanism 216, guide/air injector 210, and other components may be as previously described in connection with other embodiments. In addition to providing a simplified construction, the embodiment of FIGS. 24-26 advantageously provides a lengthened film path in the vicinity of the sealing mechanism 216 by virtue of the arcuate film path. This benefit is similar to that described above in connection with the description of the curved support surface 214 shown in FIG. 17. In short, the arcuate film path helps to compensate for dimensional changes in the film material resulting from inflation of the chambers, thereby preventing unwanted gathering of the film as it passes through the machine.

As described in co-pending published application U.S. 2007/0251190 A1, the disclosure of which is hereby incorporated by reference in its entirety, the apparatus may include a controller having functionality for acquiring information contained on the film or film supply, e.g., such as a radio frequency identification (RFID) tag present on the film or on a core on which a roll of film is wound. The information obtained from the film or film supply can be used to set one or more operating parameters for operation of the apparatus, such as seal temperature, seal pressure, air-fill levels, and operational timing delays in the drive components. These and other operating parameters may be affected by the thickness and composition of the film, the size and configuration of the inflatable chambers, and/or other properties of the film. The controller optionally can be configured to write data back to the tag. For example, as described in published application U.S. 2007/0251190 A1, as the roll of film is processed the controller can periodically write back to the tag the amount of film processed until all of the film is processed. This feature can be used to prevent a user from removing a tag from an expired film supply and affixing the tag to a new supply of material that may be incompatible or unauthorized for use with the apparatus.

In some cases, users may want to have the capability of fine-tuning certain operating parameters to meet user preferences. The controller can be configured to permit users to adjust some or all of the parameters within preset limits. For example, the user may be permitted to adjust a value within +/−10% of a programmed value. Normally a mid-range setting is selected for this programmed value to allow for slight user adjustments while preventing gross over-adjustments. Non-limiting examples of user-adjustable parameters include seal temperature and air fill level.

The drive motor for the drive rollers 222 can be a fixed speed motor or, optionally, a variable speed motor. In the case of a variable speed motor, the speed of operation can be adjusted by an operator entering information on a keypad, or can be communicated from an RFID tag or the like on the film supply.

As an alternative to RFID tags, the apparatus may utilize any number of other techniques for transmitting data from a film or film supply to the controller. For example, the film or film supply can be printed with a bar code or registration marks, or a label containing a bar code or registration marks, or the like can be adhered to the film or film supply. The controller can retrieve the information from the film or film supply using a bar code reader or other appropriate reader.

With reference to the device shown in FIGS. 8-12, the controller can be adapted to control operation of one or more of the stepper actuator 230, the sealing element 216, the blower 225, the drive belts 218a-218c, and the roll unwind tensioning mechanism 282. The controller may be configured to be capable of adjusting one or more of sealing pressure, sealing temperature, air-fill level, tension on the film roll as it is unwound, and operational timing delays in the drive components. Sealing pressure can be controlled by controlling operation the stepper actuator 230. Sealing temperature can be controlled by controlling the amount of heat supplied to the sealing element 216. Air-fill level can be controlled by controlling operation of the blower 225. Operational timing delays can be controlled by controlling operation of the various drive components. Tension on the film supply as it is unwound can be controlled by controlling operation of the linear actuator 280. Each of these parameters can be controlled according to a predetermined schedule that is appropriate for the particular film configuration used.

Operation of the perforation tear unit 250 may also be partially or fully automated. For example, the supply of film material may include registration marks that correspond to the location of the lateral perforations separating adjacent chambers or groups of chambers. The apparatus may be equipped with an appropriate reader for sensing the registration marks to enable the controller to determine the location of the perforations and appropriately control operation of the perforation tear unit 250. For example, when it is desired to tear the film along a perforation, the controller can cause the drive mechanism to advance the film, if needed, to position the perforation between the belt drive assembly 218 and the perforation tear unit 250, and then stop movement of the belt drive assembly 218. The nip rollers of the perforation tear unit may then be actuated to engage the film and pull it away from the stationary belt drive assembly 218, thereby tearing the film along the perforation. The perforation tear unit 250 may tear the film along a perforation upon a user-inputted request. Alternatively, the controller may be programmed to actuate the perforation tear unit 250 to tear the film along perforations each time a predetermined number of adjacent cushions are inflated.

The preconfigured film may have any of the above-described configurations, e.g., the film may be closed along both longitudinal edges or may be open along one longitudinal edge. The film may contain a longitudinal channel for receiving a guide and/or inflation member. Alternatively, the film may have an open edge through which air or other gas is injected to inflate the preconfigured chambers. The chambers may be generally rectangular, circular, or other desired shape.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed herein.

What is claimed is:

1. An apparatus for inflating and sealing packing cushions from preconfigured film material having a plurality of chambers, the apparatus comprising:
   a feed mechanism comprising a drive mechanism for advancing the film material along a path, a first guide member which contacts a first surface of the film material in a first longitudinal region, and a second guide member which contacts the first surface of the film material in a second longitudinal region laterally offset from and parallel to the first longitudinal region, wherein each of the first guide member and the second guide member comprises (i) a rotating belt, or (ii) a non-rotating stationary member;
   an inflation mechanism for injecting inflation gas into the chambers; and
   a sealing mechanism comprising a sealing element and a backing element, wherein the sealing element contacts the first surface of the film material in a sealing region to form a longitudinal seal to trap inflation gas in the chambers,
   wherein the backing element comprises a wheel having a resilient surface, and
   wherein the resilient surface of the wheel has a rib, wherein pressure from the sealing element creates a reactive force from the rib that deflects the resilient surface to flatten the film material in the sealing region.

2. The apparatus of claim 1, further comprising a linear actuator for adjusting a position of the sealing element.

3. The apparatus of claim 1, further comprising a thumbscrew for manually adjusting a position of the sealing element.

4. The apparatus of claim 1, wherein the sealing element comprises a rotary sealing element.

5. The apparatus of claim 1, wherein the prefabricated film material has a longitudinally extending channel, the apparatus further comprising an elongate member adapted for insertion into the longitudinally extending channel.

6. The apparatus of claim 5, wherein the elongate member has at least one opening for injecting inflation gas into the longitudinally extending channel.

7. The apparatus of claim 1 wherein each of the first guide member and the second guide member is a non-rotating stationary member.

8. The apparatus of claim 1 wherein each of the first guide member and the second guide member is a rotating belt.

9. An apparatus for inflating and sealing packing cushions from preconfigured film material having a plurality of chambers, the apparatus comprising:
- a feed mechanism comprising a drive mechanism for advancing the film material along a path, a first guide member which contacts a first surface of the film material in a first longitudinal region, and a second guide member which contacts the first surface of the film material in a second longitudinal region laterally offset from and parallel to the first longitudinal region;
- an inflation mechanism for injecting inflation gas into the chambers; and
- a sealing mechanism comprising a sealing element and a backing element, wherein the sealing element contacts the first surface of the film material in a sealing region to form a longitudinal seal to trap inflation gas in the chambers;
- wherein the backing element comprises a belt constructed from a resilient material; and
- wherein the belt has a rib, wherein pressure from the sealing element creates a reactive force from the rib that deflects the belt to flatten the film material in the sealing region.

10. An apparatus for inflating and sealing packing cushions from preconfigured film material having a plurality of chambers each having an unsealed opening into a longitudinally extending channel, the apparatus comprising:
- a feed mechanism comprising a drive roller for advancing the film material along a path, a first non-rotating stationary guide member which contacts a first surface of the film material in a first longitudinal region, and a second non-rotating stationary guide member which contacts the first surface of the film material in a second longitudinal region laterally offset from and parallel to the first longitudinal region;
- an elongate member adapted for insertion into the longitudinally extending channel for guiding the film material, the elongate member having an inflation mechanism for injecting inflation gas into the chambers; and
- a sealing mechanism comprising a rotary sealing element and a backing belt, wherein the rotary sealing element contacts the first surface of the film material in a sealing region to form a longitudinal seal to trap inflation gas in the chambers,
- wherein the backing belt has a rib, wherein pressure from the rotary sealing element creates a reactive force from the rib that deflects the belt to flatten the film material in the sealing region.

11. An apparatus for inflating and sealing packing cushions from preconfigured film material having a plurality of chambers each having an unsealed opening into a longitudinally extending channel, the apparatus comprising:
- a feed mechanism comprising a drive mechanism for advancing the film material along a generally arcuate path, a first non-rotating stationary guide member which contacts a first surface of the film material in a first longitudinal region, and a second non-rotating stationary guide member which contacts the first surface of the film material in a second longitudinal region laterally offset from and parallel to the first longitudinal region;
- an elongate member adapted for insertion into the longitudinally extending channel for guiding the film material, the elongate member having an inflation mechanism for injecting inflation gas into the chambers; and
- a sealing mechanism comprising a rotary sealing element and a backing wheel, wherein the rotary sealing element contacts the first surface of the film material in a sealing region to form a longitudinal seal to trap inflation gas in the chambers,
- wherein the backing wheel comprises a resilient surface having a rib, wherein pressure from the rotary sealing element creates a reactive force from the rib that deflects the resilient surface to flatten the film material in the sealing region.

* * * * *